(12) United States Patent
Girondi

(10) Patent No.: US 12,135,000 B2
(45) Date of Patent: Nov. 5, 2024

(54) FUEL FILTER

(71) Applicant: UFI FILTERS S.P.A., Porto Mantovano (IT)

(72) Inventor: Giorgio Girondi, Mantova (IT)

(73) Assignee: UFI FILTERS S.P.A., Porto Mantovano (IT)

( * ) Notice: Subject to any disclaimer, the term of this patent is extended or adjusted under 35 U.S.C. 154(b) by 411 days.

(21) Appl. No.: 17/285,964

(22) PCT Filed: Oct. 14, 2019

(86) PCT No.: PCT/IB2019/058732
§ 371 (c)(1),
(2) Date: Apr. 16, 2021

(87) PCT Pub. No.: WO2020/079561
PCT Pub. Date: Apr. 23, 2020

(65) Prior Publication Data
US 2021/0340942 A1 Nov. 4, 2021

(30) Foreign Application Priority Data
Oct. 19, 2018 (IT) .......................... 102018000009624

(51) Int. Cl.
*F02M 37/28* (2019.01)
*B01D 17/04* (2006.01)
(Continued)

(52) U.S. Cl.
CPC .......... *F02M 37/28* (2019.01); *B01D 17/045* (2013.01); *B01D 29/21* (2013.01); *B01D 29/605* (2013.01);
(Continued)

(58) Field of Classification Search
CPC ........ F02M 37/28; F02M 37/34; F02M 37/26; F02M 37/32; F02M 37/24; B01D 17/045;
(Continued)

(56) References Cited

U.S. PATENT DOCUMENTS 9,504,943 B2 * 11/2016 Girondi ................ B01D 36/005
10,010,815 B2 * 7/2018 Sturgess ................ B01D 35/18
10,150,068 B2 * 12/2018 Wildermuth ........... B01D 29/31

FOREIGN PATENT DOCUMENTS

DE     102013211209 A1    12/2014
DE     102014010997 A1    2/2016
(Continued)

*Primary Examiner* — Patrick Orme
(74) *Attorney, Agent, or Firm* — Volpe Koenig

(57) ABSTRACT

A fuel filter includes: a casing having a chamber for collecting water separated from fuel; a water level sensor that extends into the casing and is provided with an electrical water level contact extending into the collection chamber and an intermediate electrical contact arranged inside the casing and outside the collection chamber; and a water separator element having:
 a filtering element;
 a filtering element support provided with a through opening crossed by the water level sensor so that the electrical water level contact extends into the collection chamber; and
 a conductive element provided on the filtering element support and provided with:
  a water level electrode extending into the collection chamber; and
  a contact electrode electrically connected with the water level electrode, spaced apart from it and in contact with the intermediate electrical contact of the water level sensor.

15 Claims, 10 Drawing Sheets

(51) Int. Cl.
    *B01D 29/21*           (2006.01)
    *B01D 29/60*           (2006.01)
    *B01D 36/00*           (2006.01)
    *F02M 37/34*          (2019.01)

(52) U.S. Cl.
    CPC ........... *B01D 36/005* (2013.01); *F02M 37/34* (2019.01); *B01D 2201/0415* (2013.01); *B01D 2201/347* (2013.01)

(58) Field of Classification Search
    CPC .... B01D 29/21; B01D 29/605; B01D 36/005; B01D 2201/0415; B01D 2201/347; B01D 2201/295
    See application file for complete search history.

(56) References Cited

FOREIGN PATENT DOCUMENTS

| | | | |
|---|---|---|---|
| EP | 3046646 | A2 | 7/2016 |
| WO | 2015040479 | A2 | 3/2015 |

\* cited by examiner

FUEL FILTER

TECHNICAL FIELD

The present invention relates to an element for separating water from a fuel, particularly gas oil (diesel) for an internal combustion motor vehicle, and a fuel filter provide-ed with such water separator element.

BACKGROUND

Water separator elements are known, each of which comprises conductive elements adapted to cooperate with the electrical contacts of a water level sensor to extend them into a chamber for collecting the water arranged at the bottom of a casing of a fuel filter that contains such water separator element.

One need felt in the sector of water separator elements is the fact that since they are subject to periodic replacements to restore complete functionality of the fuel filter, they be replaced by reliable water separator elements that perform the aforesaid function of effective separation of the water (that is, they are difficult to tamper with and counterfeit) and simultaneously, they allow effectively signaling the accumulation of water in the collection chamber.

A further need that is felt is the one of making the electrical contact direct between the electrical contact of the water level sensor and the conductive element of the water separator element in a simpler, more stable manner less subject to disconnections, even in the presence of increased vibrations or impulse forces, and also to al-low a correct mutual positioning between the water level sensor and the water separator element.

Another need is the one of facilitating the correct mutual positioning between the water level sensor and the water separator element, regardless of the angular position of the water separator element in the casing.

Another need felt in the sector is the one of reducing the production costs and simplifying the production process of such fuel filters, in particular of the water separator element, which is a consumer good that is frequently replaced during the useful life of the fuel filter.

It is therefore an object of the present invention to meet such needs of the prior art within the scope of a simple, rational and affordable solution.

Such purposes are achieved by the characteristics of the invention given in the independent claims. The dependent claims outline preferred and/or particularly advantageous aspects of the invention.

SUMMARY

Particularly, the invention makes available a fuel filter that comprises:
- a casing that has a chamber for collecting the water separated from the fuel at a bottom of the casing;
- a water level sensor that extends into the casing and is provided with an electrical water level contact (that is, the electrical contact that measures the de-sired water level) extending into the collection chamber and an intermediate electrical contact arranged inside the casing and outside the collection chamber; and
- a water separator element housed in the casing, wherein the water separator element comprises:
  - a filtering element adapted to be crossed by the fuel;
  - a filtering element support provided with a through opening crossed by the water level sensor so that the electrical water level contact extends into the collection chamber; and
  - a (single) (electrically) conductive element provided on the filtering element support, wherein the conductive element is provided with:
    - a water level electrode extending into the collection chamber; and
    - a contact electrode electrically connected with the water level electrode and spaced apart from it, wherein the contact electrode is in contact with the intermediate electrical contact of the water level sensor.

Thanks to such solution, it is possible to achieve the above objects in an effective, affordable and reliable manner.

In particular, thanks to such solution, it is possible to obtain an effective protection of the original parts of the fuel filter and it simultaneously is possible to decrease the costs for making the parts subject to replacement, such as the water separator element, with respect to that currently known, thus also obtaining a significant simplification of the production processes of the fuel filter and of its components.

According to one aspect of the invention, a seal connection may be defined be-tween the water level sensor and the through opening.

Thanks to such solution, it is possible to obtain a separation between the water collection chamber and the environment of the casing intended to filter the fuel and/or separate the water from the fuel itself.

Furthermore, the water level sensor may have a longitudinal development along a longitudinal axis and the through opening may peripherally surround—when the water level sensor is inserted (axially) therein—a (dielectric) connection portion of the water level sensor axially interposed between the electrical water level contact and the intermediate electrical contact.

Thanks to such solution, the electrical water level contact (and the water level electrode) is securely placed below the level at which the filtering element is in the casing (in the water collection chamber) and the intermediate electrical contact is arranged inside the volume circumscribed by the filtering element so as to be easily and effectively reachable to make the direct electrical contact with the contact electrode of the water separator element.

Again, according to a preferred embodiment, the filtering element may have a substantially tubular shape developing about a longitudinal central axis into which the water level sensor is axially inserted.

In practice, the water level sensor is conveniently and effectively inserted into the filtering element with a saving of space in the casing and simultaneously allowing the easy installation and/or removal and/or replacement of the filtering element from the casing.

Advantageously, the filtering element support may comprise a lower plate fixed at a lower end of the filtering element close to the collection chamber, the through opening being made in the lower plate.

Advantageously, the filtering element support may comprise (or consist of) a support candle coaxially fixed (inside or outside) the filtering element, the through opening being made in a lower end area of the support candle (close to the collection chamber).

Thanks to such solution, it is possible to cause the electrical water level contact of the water level sensor to reach the collection chamber provided in the casing. According to a further aspect of the invention, the through opening may be surrounded by a guide body for the water level sensor.

Thanks to such solution, a self-aligning axial coupling is obtained between the water separator element and the water level sensor, that is, between the latter and the through opening, during the installation of the water separator element in the casing.

According to a preferred embodiment, the guide body may comprise or be made with a plurality of separate (radial) projections, a side of which (inner, that is, facing the through opening) lies on a common conical surface converging towards the through opening.

Thanks to such solution, the distribution of the gas oil in the water separator element is in any case optimal and is not disturbed by the presence of the guide body.

Moreover, such projections could interact with possible complementary (radial) seats that were defined on (the stem of) the water level sensor, thus allowing to obtain a substantially prismatic coupling therebetween and therefore, defining a preset mutual angular orientation between the two.

According to a further aspect of the invention, the filtering element may comprise a filtering (and/or coalescent) septum for filtering particulate present in the fuel.

Alternatively or additionally, the filtering element may comprise a hydrophobic mesh for the (final) separation of the water from the fuel.

Advantageously, the filtering septum and the hydrophobic mesh may be coaxial to each other and for example, (radially) separate.

According to a further aspect of the invention, at least one of the contact electrode of the water separator element and the intermediate electrical contact may be elastically deformable.

The force and the stability of the direct electrical contact between the contact electrode and the intermediate electrical contact have increased thanks to such solution, thus allowing to obtain an increased reliability of the direct electrical contact under all conditions of use of the fuel filter, that is, also when subject to strong vibrations or impulsive forces, as occurs in the normal use of the fuel filter.

Advantageously, the elastic yielding capacity of the contact electrode and/or of the intermediate electrical contact allows avoiding undesired damage of the contact electrode and/or of the intermediate electrical contact in the unfortunate case in which the operator appointed with replacing the water separator element should fail the first assembly operation of the casing and be forced to reposition the water separator element in the casing.

Moreover, having provided for the elastically deformable part of the direct electrical contact between the contact electrode and the intermediate electrical contact to (solely) consist of the contact electrode of the water separator element, that is, of the part that is periodically replaced when exhausted, it allows regenerating also the force of the direct electrical contact each time it is replaced, that is, it restores the optimal conditions of direct electrical contact between the contact electrode and the intermediate electrical contact.

The contact electrode and/or the intermediate electrical contact may be oriented radially with respect to such longitudinal central axis and may be elastically deformable mainly in radial direction for the same purposes.

The contact electrode and/or the intermediate electrical contact may be oriented axially with respect to such longitudinal central axis and may be elastically deformable mainly in axial direction for the same purposes.

According to a further aspect of the invention, the contact electrode and the water level electrode may (each) be defined by two opposite free ends of a single elongated conductive element made in a single (monolithic) body.

Thanks to such solution, making the conductive element and the connection/integration thereof with the filtering element support are particularly advantageous, affordable, secure and reliable.

According to a further aspect of the invention, the contact electrode and the water level electrode may (each) be defined by two opposite free ends of a single elongated conductive element developing about a central axis made in a single (monolithic) body.

The central axis of this conductive element can be, for example, coaxial (that is co-incident) with a through axis of the through opening (that is coaxial with the central longitudinal axis of the filtering element).

The (tubular) conductive element can, preferably, internally cover the (whole inner wall of the through opening).

In practice, the conductive element comprises a central stretch (for example cylindrical) inserted into the through opening and two opposite free ends with annular shape (deriving radially in a cantilevered fashion from the central stretch), which respectively define the contact electrode (the one facing towards the inside of the water separator element) and the water level electrode (the one facing outwards, that is placed outside, of the water separator element).

Advantageously, the filtering element support and the conductive element are integrated in a single body.

A further aspect of the invention makes available a fuel filter element for separating water from fuel, comprising a casing that has a chamber for collecting the water separated from the fuel, for the same purposes disclosed above; and a water level sensor that extends into the casing and is provided with an electrical water level contact extending into the collection chamber and an intermediate electrical contact arranged inside the casing outside the collection chamber; and the water separator element comprises:

a filtering element adapted to be crossed by the fuel;

a filtering element support provided with an opening adapted to be crossed by the water level sensor of the filter so that the electrical water level contact extends past the filtering element into the collection chamber; and a conductive element provided on the filtering element support, in which the conductive element is provided with:

a water level electrode configured to extend into the collection chamber; and a contact electrode electrically connected with the water level electrode and away spaced apart from it, wherein the contact electrode is configured to come into contact with the intermediate electrical contact of the water level sensor placed out-side the collection chamber.

BRIEF DESCRIPTION OF THE DRAWINGS

Further features and advantages of the invention shall be readily apparent from reading the following description provided by way of non-limiting example, with the aid of the figures illustrated in the accompanying tables.

FIG. 5 is a view of an alternative embodiment of the contact electrode of a conductive element of the water separator element according to the invention.

DETAILED DESCRIPTION OF THE PREFERRED EMBODIMENTS

With particular reference to such drawings, a fuel filter adapted to separate the water from the fuel, in particular gas oil in a diesel engine of a motor vehicle, is indicated as a whole with 10.

Figures 1, 6:
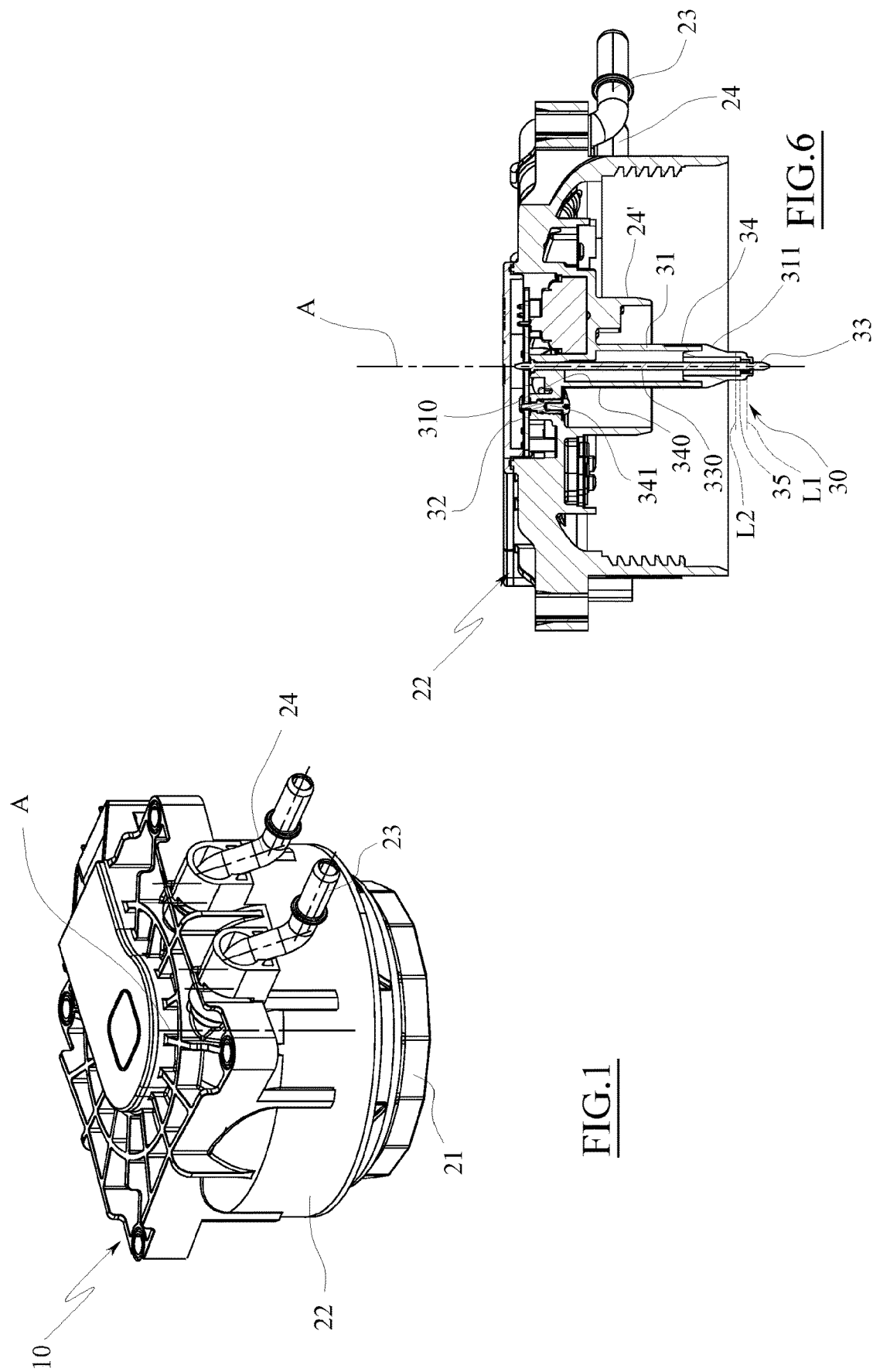
FIG. 1 is an axonometric view of a first embodiment of a fuel filter according to the invention.
FIG. 6 is a longitudinal section view of a cover of a casing and of the water level sensor of the fuel filter in FIG. 1.
Figure 2:
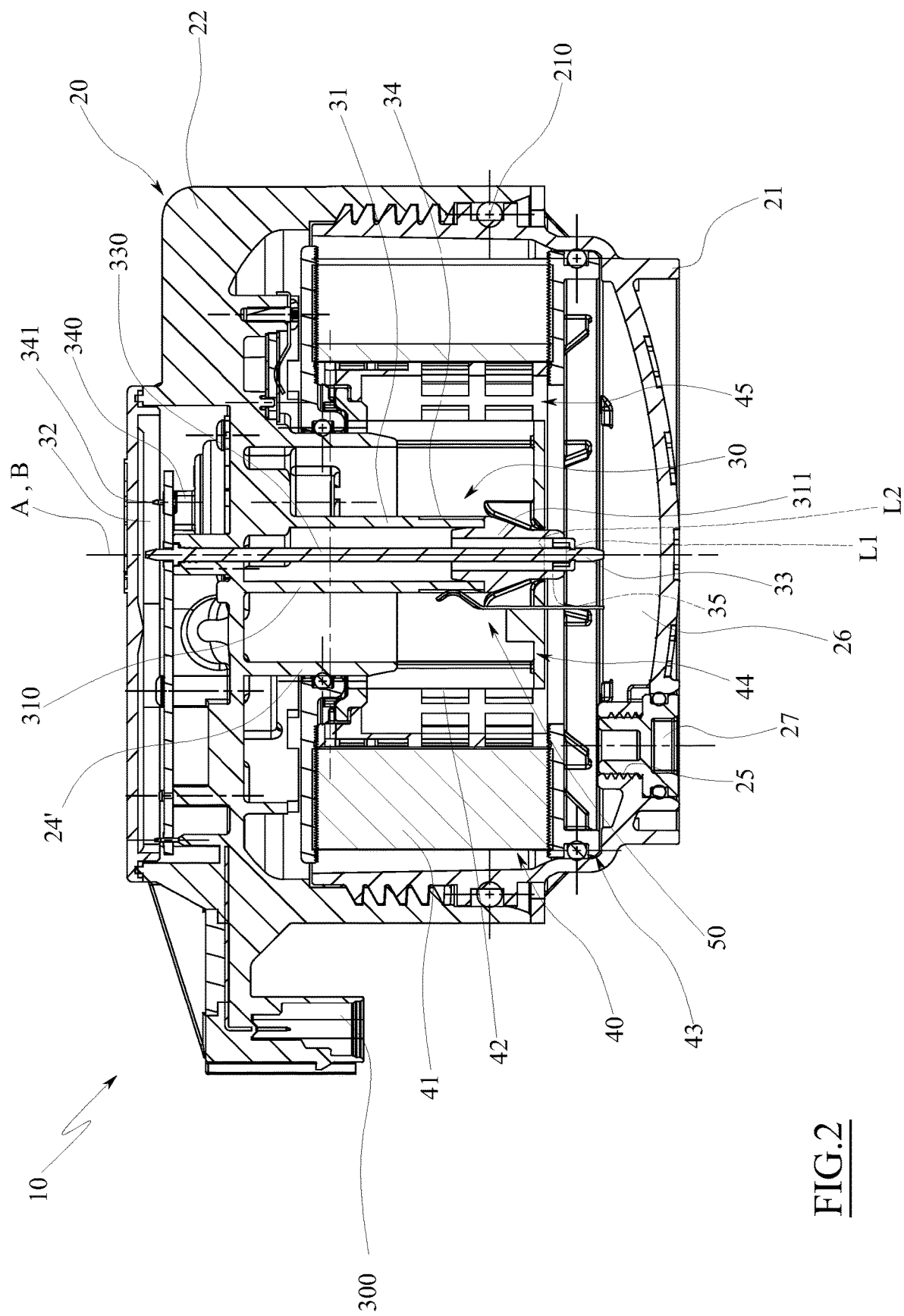
FIG. 2 is a longitudinal section view of FIG. 1.
Figure 7:
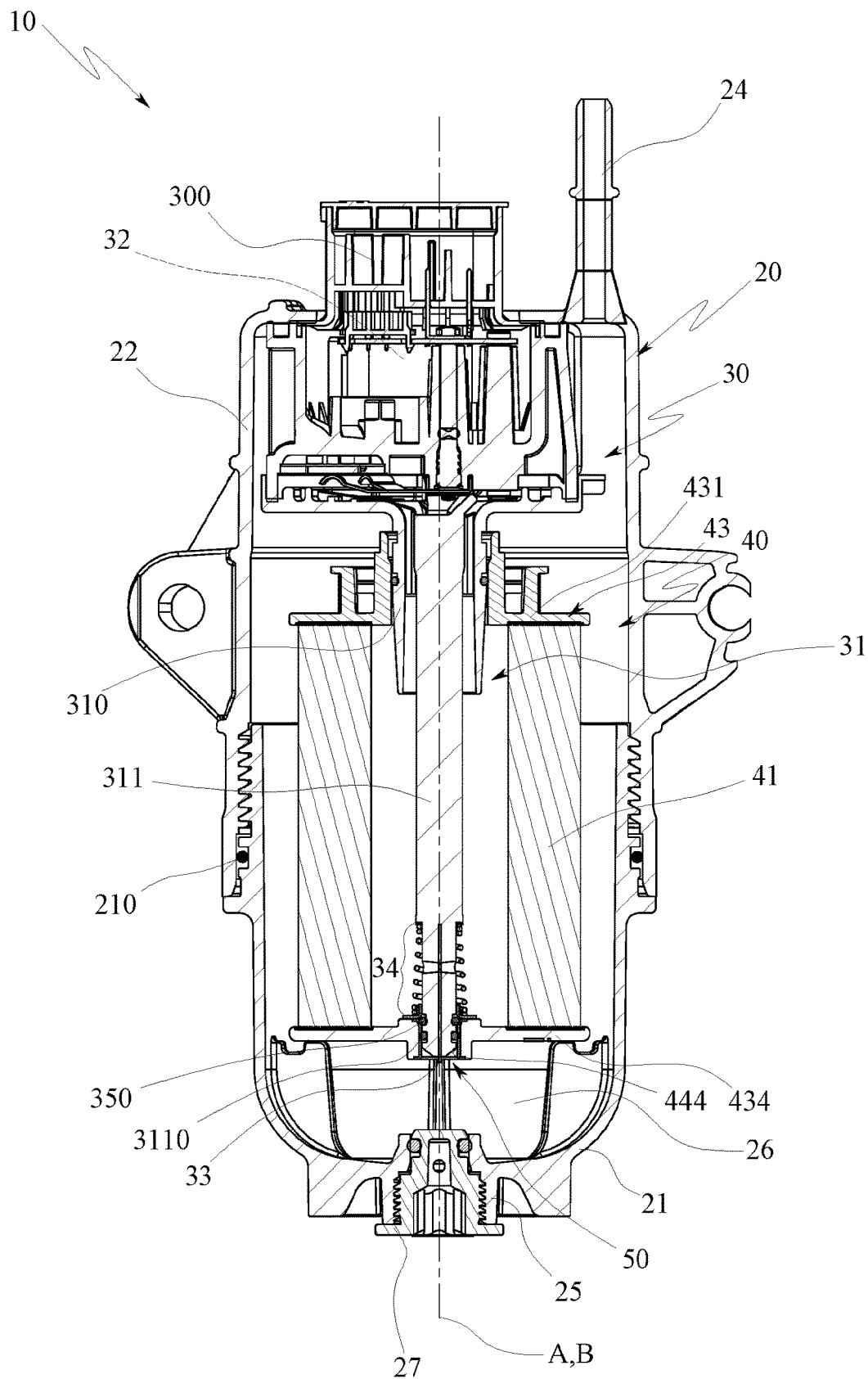
FIG. 7 is a longitudinal section view of a second embodiment of a fuel filter ac-cording to the invention.
Figure 8:
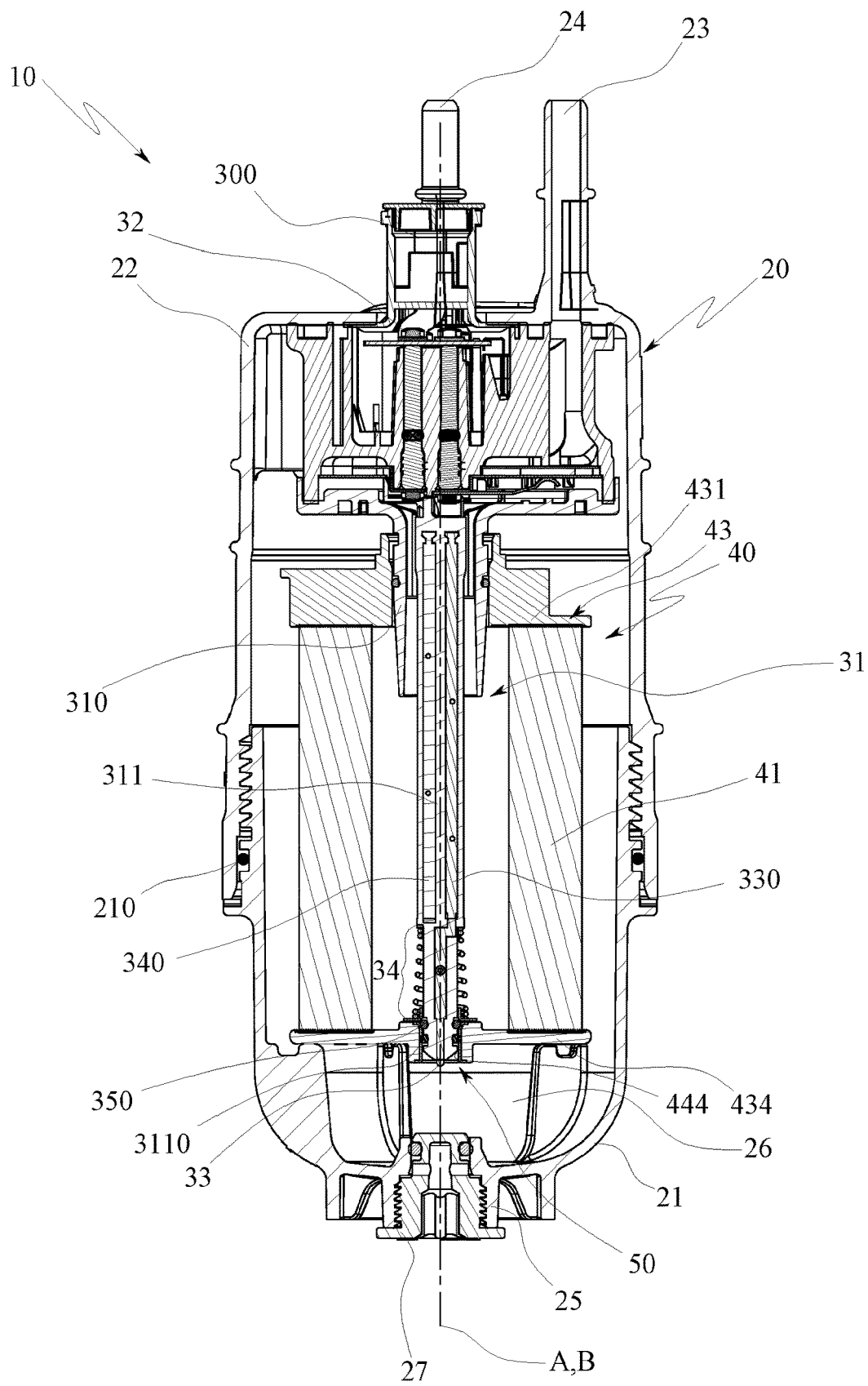
FIG. 8 is a further section view of the fuel filter of FIG. 7 according to a longitudinal section plane orthogonal to that of FIG. 7.
Figure 9:
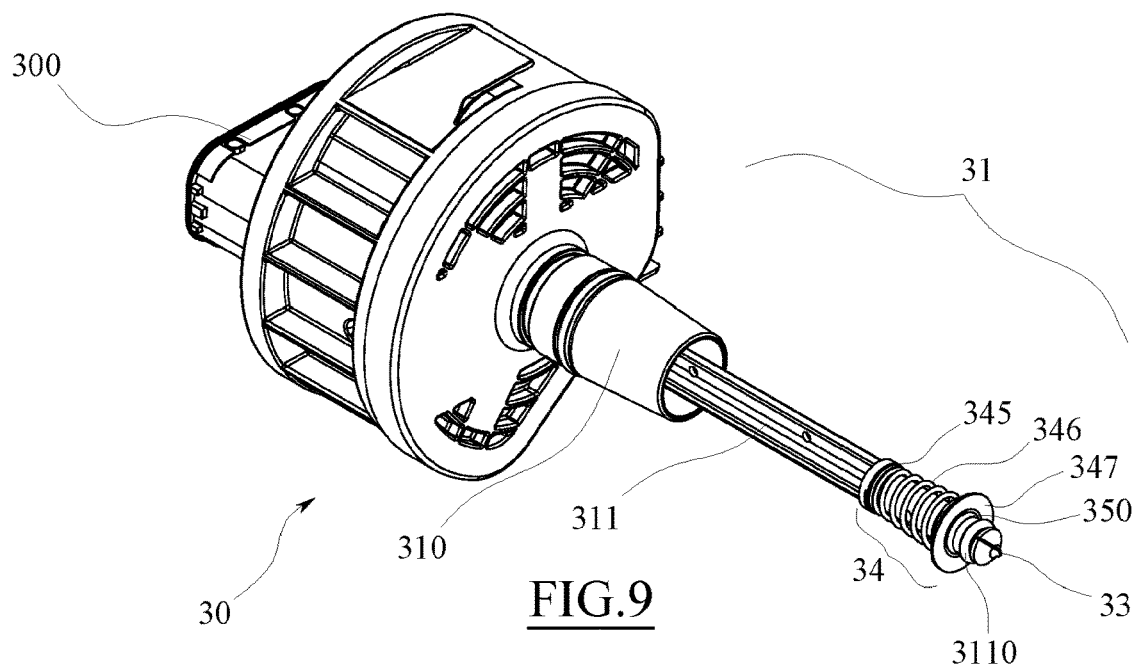
FIG. 9 is a first axonometric view of the water level sensor of the fuel filter of FIG. 7 and FIG. 8.
Figure 10:
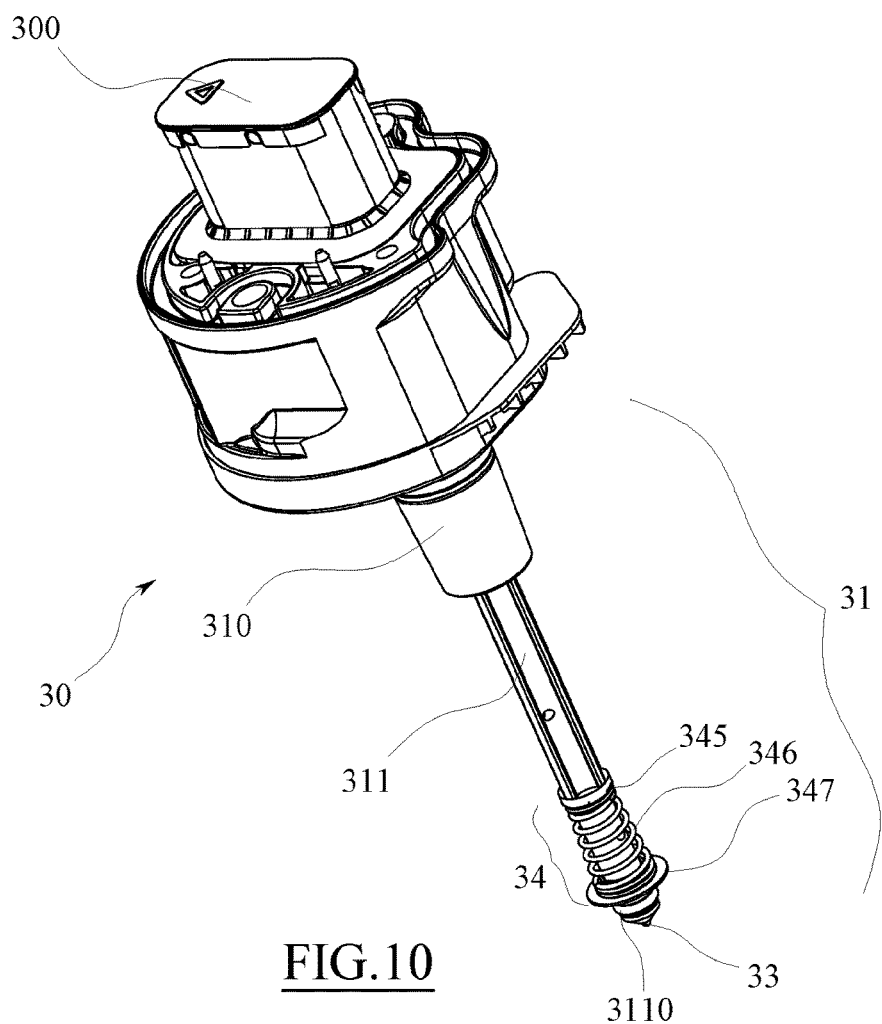
FIG. 10 is a second axonometric view of the water level sensor of FIG. 9.
Figures 11, 12:
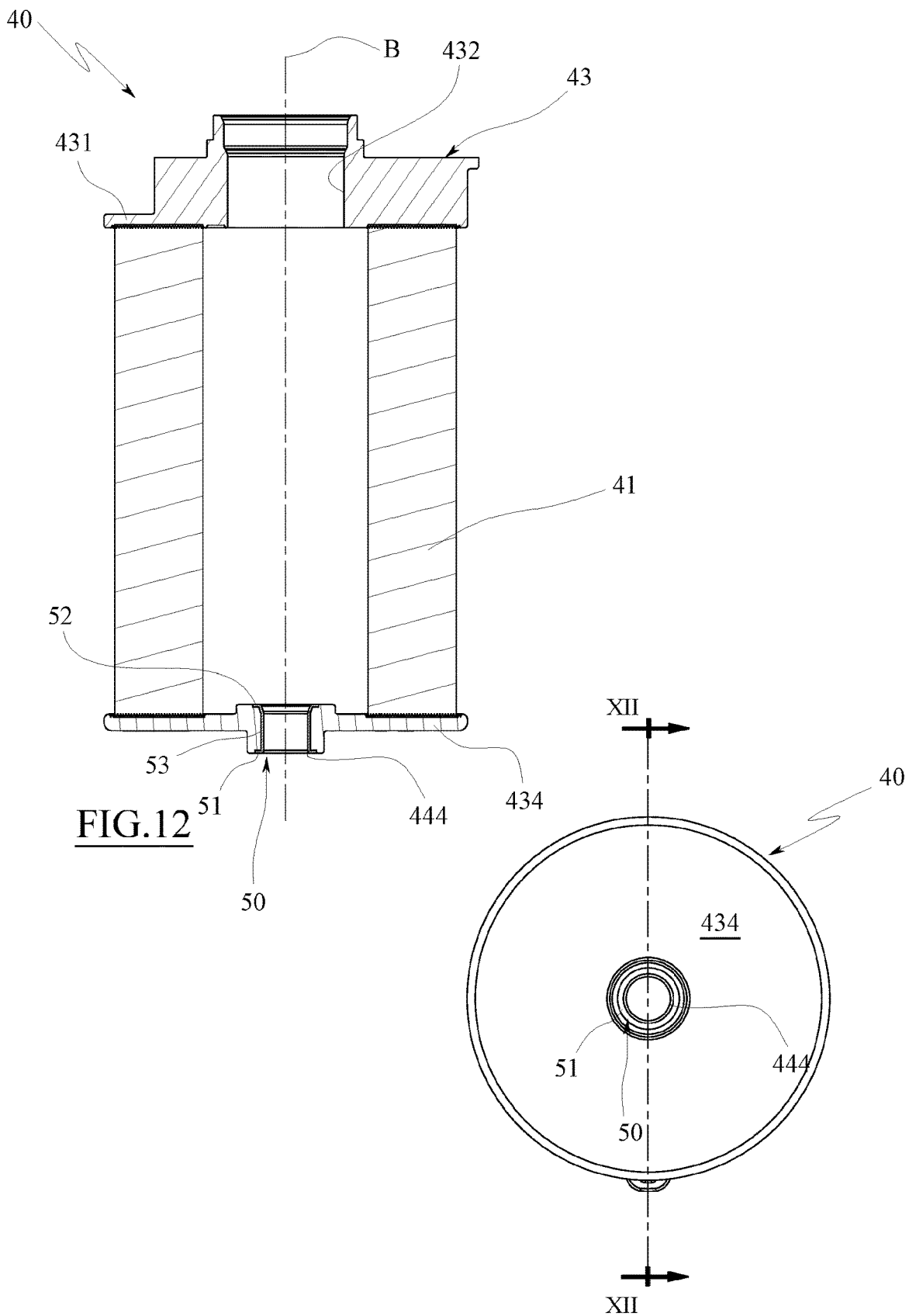
FIG. 11 is a plan view from below of a second embodiment of a water separator element according to the invention.
FIG. 12 is a section view along the section plane XII-XII of FIG. 11.
Figure 13:
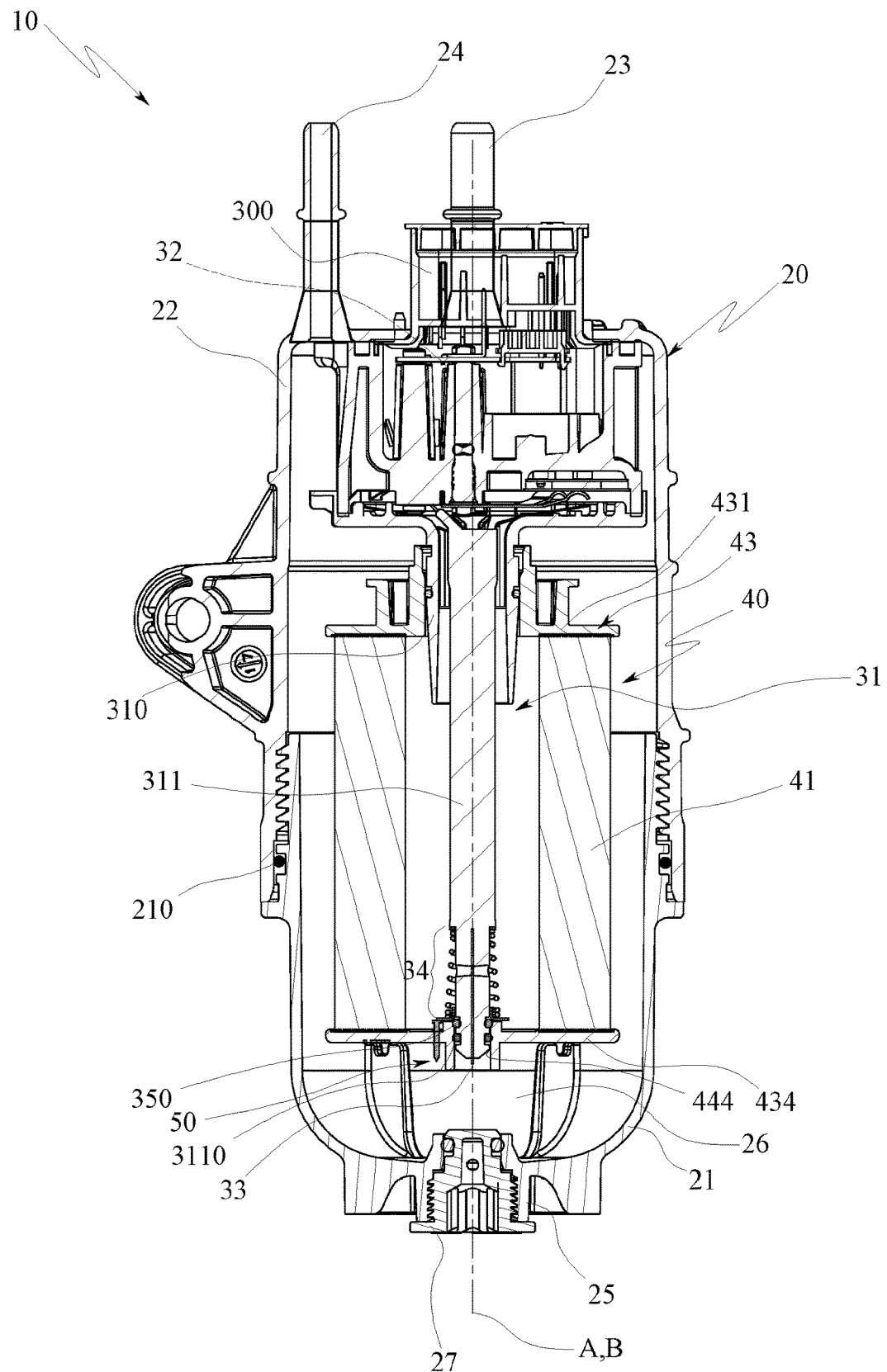
FIG. 13 is a longitudinal section view of a third embodiment of a fuel filter according to the invention.

With particular reference to FIGS. 1 and 2 and to FIGS. 7, 8 and 13, the fuel filter 10 comprises a casing 20 which in turn comprises for example, a (lower) cup-like body 21 and an (upper) cover 22 adapted to close the cup-like body 21.

The cup-like body 21 is screwed to the cover 22, preferably sealingly screwed, or by the interposition of a sealing ring 210.

In practice, the casing 20—that is, the cup-like body 21 and the cover 22—encloses an inner (closed) volume therein.

The casing 20—in the example the cover 22—comprises an inlet duct 23 for the gas oil to be filtered and an outlet duct 24 for the filtered gas oil.

Again, the casing 20—in the example the cup-like body 21—comprises a discharge duct 25 for the water that accumulates on the bottom of the casing 20, that is, of the cup-like body 21, for example at a collection chamber 26 in which such water separated from the fuel, is collected.

The collection chamber 26 is defined by the lower portion of the inner volume of the casing 20, close to the bottom of the cup-like body 21.

Moreover, a cap 27 (see FIG. 2 and FIGS. 7,8 and 13) removably occludes the discharge duct 25, for example by means of a threaded connection.

The whole casing 20—that is, both the cup-like body 21 and the cover 22—is made of an electrically insulating (dielectric) material, for example plastic (like a polyamide-based material—PA—or a polyethylene-based material—PBT).

As shown in the figures, the fuel filter 10 comprises a water level sensor 30, for example that can also be independently protected, which is configured to sense the level of the water that accumulates in the collection chamber 26 during the filtration of the fuel and is associated with an electronic unit for controlling the vehicle (not shown), as is known to the expert in the field (that is through a connector 300).

The water level sensor 30 comprises a longitudinal stem 31, for example substantially hollow, and having a central longitudinal axis A.

The stem 31 is made of an electrically insulating (dielectric) material, for example plastic (like a polyamide-based material—PA—or a polyethylene-based material—PBT).

The stem 31 comprises an upper stretch, which is rigidly constrained (for example fixed in a stably irremovable or removable manner) to the cover 22 (inside it) and a lower stretch (which defines the free end thereof) which derives at the bottom of the upper stretch and is configured to lead into or facing the collection chamber 26 (when the cover 22 closes the cup-like body 21).

In the first embodiment shown in FIGS. 1-6, the stem 31 has a cylindrical stretch 310 (which defines the aforesaid upper stretch), the upper end of which is con-strained to (and deriving directly from) the cover 22, and the lower end of which is closed, for example by a closing cap 311 (which defines the aforesaid lower stretch).

The closing cap 311 is (or has at least one axial stretch that is) conical or frustoconical in shape, converging towards the free end thereof.

The closing cap 311 is for example, removably associated with the cylindrical stretch 310, preferably by means of an interference or snap connection, or other known connection (like a thread and/or bayonet or similar connection).

The closing cap 311 has a bottom wall in which there is defined a (circular) opening, for example a central opening, that is, coaxial with the longitudinal axis A of the stem 31.

In an alternative embodiment, the closing cap 311 and the cylindrical stretch 310 could be irremovably associated, for example be made in a single body; in such case, the upper end of the cylindrical stretch 310 is adapted to be removably coupled to a hooking shank provided on the inner wall of the cover 22.

The water level sensor 30 is integrated in the cover 22 in the example shown in FIGS. 1-6, in particular the stem 31 is derived at the bottom of the cover 22 itself and is made in a single body therewith, and it extends into the inner volume of the casing 20 towards the bottom of the cup-like body 21 (not at null distance from the latter).

However, it is not excluded that—as shown in the second and third implementing embodiment illustrated in FIGS. 7-15—the stem 31 may be in a separate body with the cover 22, preferably joined thereto by means of fixing members (for example interlocking or other known fixing member).

In this second and third implementing embodiment (FIGS. 7-15), the stem 31, that is the upper stretch thereof, comprises a substantially cylindrical or (slightly) frustoconical sleeve 310 (with a smaller base facing downwards), the upper end of which is constrained to (and deriving directly from) a support body of the water level sensor 30, which—in turn—is rigidly constrained (that is fixed in a removably or irremovably stable manner) to the cover 22.

In this embodiment, moreover, the stem 31 comprises a longitudinal rod 311 (coaxially inserted inside the sleeve 310 and at a radial distance therefrom that is not null), which has an upper end which is constrained to (and deriving directly from) the support body of the water level sensor 30, and a lower end (which defines the lower stretch of the stem 31) which derives at the bottom of the upper stretch (that is of the sleeve 310) and is configured to lead into or facing to the collection chamber 26 (when the cover 22 closes the cup-like body 21).

At the lower end of the longitudinal rod 311 an annular seat is provided in which a lower annular gasket 3110 (fitted on the longitudinal rod itself) is housed.

The rod 311 is for example defined by a solid body or by a body with a substantially cross-section or other desired shape.

Between the sleeve 310 and the longitudinal rod 311 a radial gap is defined which defines an axial end stretch of a fluid inflow or outflow duct, in the example of the inlet duct 23, that is which connects to it through the body of the water level sensor support 30.

The water level sensor 30, in general, also comprises an electronic control circuit 32, which preferably is defined by an electronic board, in which the electronic control circuit 32 is contained inside a housing seat made in the cover 22 (and/or in the stem 31, that is in the support body where provided).

In general, the stem 31 supports a pair of separate electrical contacts, distinct from one another, of which one electrical water level contact 33 and one intermediate electrical contact 34, which surface (or emerge or are arranged) outside the stem 31 itself, that is, they are such as to be visible and/or contactable from the outside of the stem 31.

Water level electrode means a conductive surface of the water level sensor 30 from which the stem 31 (the plastic with which it is made) emerges or protrudes and is adapted in use, to be immersed into (that is wetted by) the fluid being filtered, that is, into the fuel and/or the water that accumulates in the collection chamber 26, in direct contact therewith, so as to define a probe immersed in the fluid of the water level sensor 30.

The electrical water level contact 33 and the intermediate electrical contact 34 of the water level sensor 30 are mutually (in use, that is when the fuel filter 10 is in operation and/or correctly installed and complete) substantially axially (and/or radially) off-set, that is they are placed in different axial (and/or radial) positions along the longitudinal axis A of the stem 31.

For example, the electrical water level contact 33 and the intermediate electrical con-tact 34 of the water level sensor 30 are placed (in use) at different heights in the casing 20, preferably at two different distances (not null) from the bottom of the cup-like body 21.

Both the electrical water level contact 33 and the intermediate electrical contact 34 of the water level sensor 30 are (as a whole) made of an electrically conductive material, for example of metal (such as steel, preferably stainless steel, aluminum or copper) and are electrically connected to one of the electrical terminals of the electronic control circuit 32, as is more apparent below.

The electrical water level contact 33 is configured to extend directly into the collection chamber 26, that is, to lead into and be arranged therein.

For example, the electrical water level contact 33 is defined at a free (lower) end of the stem 31 that is, distal from the cover 22 (and close to the bottom of the cup-like body 21).

Preferably, the electrical water level contact 33 extends axially from the lower free end of the stem 31 by an axial stretch (not null) and axially extends the stem 31 itself.

It is not excluded that, in certain circumstances, the electrical water level contact 33 may be substantially at a height that is substantially equal to the lower free end of the stem 31 or be recessed in it by a (small) axial stretch.

The electrical water level contact 33 is, for example, placed at an axial height lower than the axial height at which the lower annular gasket 3110 (where provided, see FIGS. 7-15) is located.

Preferably, the electrical water level contact 33 (that is, the free lower end thereof) is placed at a predetermined distance (not null) from the bottom of the cup-like body 21 (and the upper end thereof, constrained or joined to the stem 31, is placed at a distance from the bottom that is greater than or at the limit equal to said predetermined distance).

The electrical water level contact 33 in the example illustrated is defined by an axisymmetric body (solid in the example), in which the central symmetry axis preferably coincides with the longitudinal axis A of the stem 31.

Preferably, but in a non-limiting way, the electrical water level contact 33 comprises an upper cylindrical stretch and a conical (see FIGS. 1-6) or hemispherical (see FIGS. 7-15) stretch, converging towards the lower free end thereof.

The electrical water level contact 33 is the (lower) end stretch that emerges (that is, axially protrudes) from the stem 31 of a conductive column 330, for example a metal column, the upper stretch of which is contained in the stem 31 and it is directed to-wards (see FIGS. 7-15) or it extends (and enters), see FIGS. 1-6, at the top into the housing seat of the electronic control circuit 32 with which it is in (direct) electrical contact.

In the first embodiment shown in FIGS. 1-6, the conductive column 330 has, for example at the upper end thereof, a connection body adapted to be for example snappingly connected or connected by interference, to the cover 22 so that the up-per end thereof leads into the housing seat of the electronic circuit to be electrically connected to one of the electrical terminals thereof (for example, to the first electrical terminal thereof).

The conductive column 330 is inserted to measure, at the lower stretch thereof, into the opening of the closing cap 311 and for example, is axially blocked therein by means of a constraining connection, for example a snap connection (obtained by means of a plurality of radially flexible teeth made in the closing cap 311 which are snappingly inserted into an annual seat made in the conductive column 330 and which axially separates the upper stretch, in the stem 31, of the conductive column itself from the lower stretch, outside the stem 31, which defines the electrical water level contact 33).

In the second and third embodiment shown in FIGS. 7-15, the conductive column 330 is inserted (incorporated) in the stem 31, that is in the longitudinal rod 311 thereof, for example co-molded therewith (that is emerging therefrom inside a suitable groove).

Even though the intermediate electrical contact 34 is in the inner volume of the casing 20, it is configured to be positioned outside the collection chamber 26, that is, at a height in the casing 20 that is never reached by the level of the water that accumulates in the inner volume of the casing 20.

In practice, the intermediate electrical contact 34 is at a predetermined (fixed or adjustable) (not null) distance from the bottom of the cup-like body 21 that is (much) greater than the distance from the bottom of the cup-like body 21 of the upper end of the electrical water level contact 33, that is, greater than the distance from the bottom of the cup-like body 21 of the free end of the stem 31.

The intermediate electrical contact 34 is axially (and electrically) separate from the electrical water level contact 33 (by means of a dielectric axial and/or radial stretch of the stem 31 axially interposed therebetween and/or by means of an empty axial and/or radial interspace).

The intermediate electrical contact 34 is for example, at a radial distance that is not null from the longitudinal axis A of the stem 31.

For example, in the first embodiment of FIGS. 1-6, the intermediate electrical con-tact 34 is defined at a (lower) end of the cylindrical stretch of the stem 31 that is distal from the cover 22 (and close to the bottom of the cup-like body 21).

The intermediate electrical contact 34 in the example illustrated in this first embodiment, is defined by (that is consists of) a substantially annular body (for example substantially axisymmetric), in which the central (symmetry) axis preferably coincides with the longitudinal axis A of the stem 31.

In this first embodiment shown in FIGS. 1-6, the (whole) radial outer wall of the intermediate electrical contact 34 is exposed by the stem 31, that is, it itself defines the intermediate electrical contact 34 that is adapted to be supported internally by the outer surface of the stem 31.

According to a preferred embodiment, the (rigid) intermediate electrical contact (34) is a radial contact facing outwards, that is, facing the opposite side with respect to the longitudinal axis A.

It is not excluded for an axial lower wall of the intermediate electrical contact 34 to be exposed by the stem 31 (radially projecting therefrom), that is, to it itself define the intermediate electrical contact 34 that is adapted to be axially contacted from below.

According to an alternative embodiment (of this first embodiment), the (rigid) intermediate electrical contact 34 is an axial contact facing downwards, that is, facing to-wards the bottom of the cup-like body 21 (or of the casing 20 in general).

For example, the intermediate electrical contact 34 is defined by a looped (flat and elongated) strip folded about the central axis (coinciding with the longitudinal axis A of the stem 31) and (substantially) joined at the opposite ends.

In a simplified embodiment (of this first embodiment), an incomplete union could be provided between the opposite ends of such a folded strip, that is, a (dielectric) circumferential interspace could be provided between them.

In practice, the intermediate electrical contact 34 is wound on an axial portion of the stem 31, for example of the cylindrical stretch thereof.

For example, the intermediate electrical contact 34 may be or comprise at least one conical axial stretch converging towards the lower free end thereof, or be completely cylindrical in shape.

Alternatively (according to this first embodiment), the intermediate electrical contact 34 may be configured like a flat foil or like a circular sector (that does not extend completely for the whole turn, but only for a limited arc). Here too, the intermediate electrical contact 34 may be or comprise at least one substantially conical axial stretch converging towards the lower free, or in any case inclined, end thereof.

For example, in the second and in the third embodiment of FIGS. 7-15, the intermediate electrical contact 34 is defined at a (lower) end stretch of the longitudinal rod 311 of the stem 31 distal from the cover 22 (and close to the bottom of the cup-like body 21).

According to this second and third embodiment, the (deformable) intermediate electrical contact 34 is—as a whole—an axial contact facing downwards, that is, facing towards the bottom of the cup-like body 21 (or of the casing 20 in general), as will be better described below.

The intermediate electrical contact 34 in the example illustrated in this second and third embodiment, comprises (or may comprise) a first substantially annular body 345 (for example substantially axisymmetric), in which the central (symmetry) axis preferably coincides with the longitudinal axis A of the stem 31.

In this second and third embodiment shown in FIGS. 7-15, the (whole) lower axial outer wall of the first body 345 is exposed by the stem 31 (that is by the longitudinal rod 311 and is adapted to be supported internally by the outer surface of the stem 31, for example at a step or a radial enlargement of the longitudinal rod 311.

For example, the first body 345 may consist of (or comprise) a (flat or disc/conical) washer or a looped (flat and elongated or conical) strip folded about the central axis (coinciding with the longitudinal axis A of the stem 31) and (substantially) joined at the opposite ends. The first body 345 is made of an electrically conductive material.

In a simplified embodiment (of this first embodiment variant of the second and third embodiment), an incomplete union could be provided between the opposite ends of such a folded strip, that is, a (dielectric) circumferential interspace could be provided between them.

The first body 345 of the intermediate electrical contact 34 is, in practice, wound on an axial portion of the stem 31, in particular of the longitudinal rod 311, for example on an axial intermediate portion thereof (and spaced by an axial distance that is not null) between the lower end of the lower stretch (that is, of the longitudinal rod 311) and the free lower end of the upper stretch (that is, of the sleeve 310).

As an alternative to what has been described above (according to this second or third embodiment), the first body 345 of the intermediate electrical contact 34 may be configured like a flat foil or like a circular sector (that does not extend completely for the whole turn, but only for a limited arc).

The first body 345, in practice, is located at an axial height of the stem 31 (that is of the longitudinal rod 311) that is different from the lower free end thereof, for example in a proximal zone at a median axial height of the length of the stem 31 (that is of the longitudinal rod 311).

According to this second and third embodiment, the lower axial wall of the first body 345 of the intermediate electrical contact 34 is exposed by the stem 31, that is by the longitudinal rod 3211, and projects axially (or radially) therefrom and/or is facing downwards, that is facing towards the bottom of the cup-like body 21 (or of the casing 20 in general).

In this second and third embodiment of FIGS. 7-15, the intermediate electrical con-tact 34 comprises, in particular, a main body 346, which for example has at least one portion (with respect to the stem 31) that is movable or with a variable dimension.

The main body 346 defines the deformable (axially deformable) body of the intermediate electrical contact 34.

The main body 346 of the intermediate electrical contact 34 is for example wound about the longitudinal axis A.

The main body 346 is made of an electrically conductive material. For example, the main body 346 has a helical shape wound in a spiral about a central axis, preferably coinciding with the longitudinal axis A of the stem 31.

In practice, the main body 346 has an upper axial end (defined by an upper end coil) and an opposite lower axial end (defined by a lower end coil), which are placed at different axial heights along the longitudinal axis A of the stem 31 (that is of the longitudinal rod 311).

Preferably, the main body 346 is elastically deformable in the axial direction.

In particular, the main body 346 comprises (or consists of) a helical spring.

Preferably, this helical spring has a substantially frusto-conical shape with the enlarged end positioned at the bottom.

Particularly, the main body 346 is wound (externally) on an axial portion of the stem 31, in particular of the longitudinal rod 311, for example on an intermediate axial stretch thereof (and spaced by an axial distance that is not null) between the lower end of the lower stretch (that is of the longitudinal rod 311) and the free lower end of the upper stretch (that is of the sleeve 310), for example axially interposed between the first body 345 (that is the lower axial outer wall thereof), where provided, and the lower end of the lower stretch (that is of the longitudinal rod 311).

The main body 346 is supported by the stem 31 (that is by the longitudinal rod 311) on the outside of the stem itself.

The upper axial end of the main body 346 is located for example at the step or a radial enlargement of the longitudinal rod 311.

The upper axial end of the main body 346 is in (direct) contact with the first body 345 (where provided), that is with a (circumferential) portion of the lower axial outer wall of the first body 345 itself.

For example, the main body 346, that is the upper axial end of the main body 346 itself, can be permanently fixed to the first body 345 (where provided), that is to the (circumferential) portion of the lower axial outer wall of the first body 345 itself with which it is in contact.

For example, in this case, the main body 346, that is the upper axial end of the main body 346 itself, can be permanently welded to the first body 345 (where provided), that is to the (circumferential) portion of the lower axial outer wall of the first body 345 itself with which it is in contact.

However, it is not excluded that the main body 346, that is the upper axial end of the main body 346 itself, can be made in a single piece with the first body 345 (where provided).

Yet, it is possible to provide that the main body 346, that is the upper axial end of the main body 346 itself, can be permanently fixed by means of a conductive fixing system, such as for example using conductive adhesives or fixing riveted or threaded systems or other known permanent or semi-permanent fixing system, to the first body 345 (where provided), that is to the (circumferential) portion of the lower axial outer wall of the first body 345 itself with which it is in contact.

Yet, it not excluded that the main body 346, that is the upper axial end of the main body 346 itself, can be fixed in a removable or releasable way, for example by means of releasable fixing systems (such as screws, bolts, or groups of hooks or the like), to the first body 345 (where provided), that is to the circumferential portion of the lower axial outer wall of the first body 345 with which it is in contact.

In this case, it is possible to provide that the fixing systems are such as to guarantee in any case the continuity (that is, the non-interruption) of the electrical connection between the main body 346 and the first body 345 (that is of the possibility of contacting electrically—without interruption—the first body 345 and the main body 346).

The fixing systems are configured to prevent the axial extraction of the main body 346 from (the free lower end of) the stem 31 (that is the longitudinal rod 311), that is they are configured to support and anchor the main body 346 to the stem 31 (that is of the longitudinal rod 311).

The fixing systems can comprise, for example, a retaining element 350, which projects radially outwards (protrudes) from the stem 31, that is from the longitudinal rod 311 and defines a shoulder adapted to counteract and/or prevent the axial extraction of the main body 346 from the stem 31, that is (from the free lower end of) the longitudinal rod 311.

In practice, the main body 346, for example the lower axial end thereof or the upper axial end thereof or any intermediate axial stretch between the lower axial end thereof and the higher axial end thereof rests (directly or indirectly) on the retaining element 350.

In the example, the retaining element 350 has an upper surface (facing towards the upper constrained end of the stem 31, that is on the side opposite the bottom of the cup-like body 21) on which the main body 346 rests (directly or indirectly).

The retaining element 350 is fixed to a predetermined (and fixed) axial height of the stem 31, that is of the longitudinal rod 311, preferably comprised between the (excluded) free lower end and the aforesaid step.

More particularly, the retaining element 350 is axially interposed between the aforesaid step and the lower annular gasket 3110 provided on the longitudinal rod 311.

In the illustrated example, the aforesaid axial height is closer to the lower free end than to the step.

In a preferred embodiment, the retaining element 350 is removably fixed to the stem 31, that is to the longitudinal rod 311.

It is not excluded that this retaining element can be permanently fixed to the stem 31 and/or in a movable manner.

More in detail, the retaining element 350 is defined by an annular body fitted (coaxially) on the stem 31, that is on the longitudinal rod 311, for example inserted (to measure) in an (radially open) annular seat formed on the stem itself (that is on the same longitudinal rod 311).

In the illustrated example, the retaining element 350 comprises or consists of a ring, preferably an elastically deformable ring (that is an O-ring).

It is not excluded, however, that the retaining element 350 is defined by a rigid ring (such as a washer or a threaded nut or a threaded or semi-rigid ring nut (such as a Seeger ring)) or other technically equivalent element.

The axial position of the retaining element 350 is such as to define in the main body 346 a predetermined pre-load (that is a pre-compression).

The aforesaid pre-compression is such that the helical spring that defines the main body 346 is such as to be compressed between the first body 345—where provided—and/or the step and the retaining element 350, that is it has a smaller axial elongation than the axial (or undeformed) elongation at rest.

This pre-compression is such as to favor a forced contact between the upper axial end of the main body 346 and the first body 345.

Equivalently, the fixing systems can comprise, for example, one or more retaining elements, each of which projects radially inwards (protrudes) from the main body 346 (directly or indirectly) and defines a shoulder adapted to counteract and/or pre-vent the axial extraction of the main body 346 from the stem 31, that is (from the free lower end of the) longitudinal rod 311, since it is inserted in a respective axial groove/guide provided with a lower end-of-stroke and adapted to house this retaining element.

In this case, each retaining element is defined by a respective radial tooth which projects inside the main body (and is fixed thereto, indirectly or directly), for example at/close to the lower axial end thereof.

Yet, alternatively, the fixing systems could provide suitable (radially internal) grooves or notches made (directly or indirectly) on the main body 346 (that is at or close to the lower axial end thereof) and configured to house respective (axial) ribs protruding radially from the stem 31 (that is from the longitudinal rod 311) and provided with lower end-of-strokes.

As also stated above, it is possible to provide that the main body 346, that is the up-per axial end of the main body 346 itself, can be simply resting (forced) on the first body 345 (where provided), that is on the (circumferential) portion of the lower axial outer wall of the first body 345 itself with which it is in contact; in other words, the mutual contact can be ensured by the thrust force of the helical spring which press-es (by axially pushing, from the bottom upwards) the upper axial end of the main body 346 against the lower axial outer wall of the first body 345.

In this case, the retaining element 350 acts, for example, as a lower shoulder and pre-load for the main body 346 which generates the aforesaid axial thrust which ensures the forced (and therefore safe) contact between the upper axial end of the body main 346 and the first body 345 (where provided).

The intermediate electrical contact 34 may also comprise (as illustrated) a second body 347 which is substantially (axisymmetric) annular, in which the central (symmetry) axis preferably coincides with the longitudinal axis A of the stem 31.

Preferably the second body 347 is positioned on the lower end of the main body 346.

Preferably, the second body 347 is fitted on the stem 31, that is on the longitudinal rod 311, for example substantially at the same axial height at which the lower axial end of the main body 346 is located.

Preferably, the second body 347 is (in electrical contact and) rigidly fixed to the lower axial end of the main body 346 (and extends and/or—de facto—defines the same).

In practice, the second body 347 has an upper axial outer wall, which lies substantially on a plane orthogonal to the longitudinal axis A of the stem 31 and is facing towards the upper constrained end of the stem 31, and a lower axial outer wall, which lies substantially on a plane orthogonal to the longitudinal axis A of the stem 31 and is facing towards the free lower end of the stem 31 (that is towards the bottom of the cup-like body 21).

The upper axial outer wall is in (direct) contact and constrained, for example by (conductive) welding or (conductive) gluing or other permanent or semi-permanent (or at the limit removable/releasable) fixing system, at the lower axial end of the main body 346 (that is at least one—helical—stretch of the last lower end coil of the same).

Furthermore, it is not excluded that the second body 347 can be made in a single piece with the main body 346.

For example, the second body 347 may consist of (or comprise) a (flat or disc/conical or shaped) washer.

In the example, the second body 347 is defined by a washer which has a rising central cylindrical stretch at the top which defines and delimits a central (circular) hole.

The second body 347 has a central hole having an inner diameter (or minimum dimension) smaller than the (maximum) outer diameter of the retaining element 350.

In this way, the retaining element 350 defines a shoulder (as defined above) for the second body 347 (and therefore indirectly for the lower axial end of the main body 346).

The second body 347 has an outer diameter (or maximum dimension) greater than (or equal to) the (maximum) outer diameter of the lower axial end of the main body 346.

In this way, the lower axial outer wall defines a relatively large circular crown which surrounds (at a distance) the stem 31 (that is the longitudinal rod 311 thereof) facing axially downwards.

The lower axial outer wall of the second body 347 (where provided) or the lower axial end of the main body 346 (that is the last lower end coil of the helical spring which defines the main body 346) is facing axially downwards (that is the bottom of the cup-like body 21) and defines the contact surface (or electrically contactable) of the intermediate electrical contact 34 as a whole (as will be described in greater de-tail below).

In practice, the contact (or contactable) surface is the surface which is intended, in use, to be (directly) contacted by an electrically conductive element (for example of metal) of a structure separate and separable from the water level sensor 30 (for example from a conductive element provided on the filtering element support, which will be better described below).

In practice, the intermediate electrical contact 34, in the second and third embodiment of FIGS. 7-15, is composed of the union of several electrically conductive bodies (the first body 345, the main body 346 and the second body 347) constrained to one another and with mutual contact, so that the electrical connection between them is always guaranteed (without interruption).

The intermediate electrical contact 34 (both in the first embodiment of FIGS. 1-6 and in the second and in the third embodiment of FIGS. 7-15) is the (lower) end stretch of a conductive foil 340, for example a metal foil, the upper stretch of which is (for example fixed to the cover 22, that is, it is) electrically connected with the electronic control circuit 32 inside the housing seat.

For example, as shown in the first embodiment of FIGS. 1-6, the conductive foil 340 is (completely) arranged outside the stem 31, preferably wraps a circumferential portion (smaller than the turn, for example smaller than the right angle) of the stem 31, that is, of the cylindrical stretch thereof.

In this case, the conductive foil 340 has for example, at the upper end thereof, a connection stretch which is defined by a (90°) fold that rests on the lower surface of the cover 22, that is, below the housing seat of the electronic control circuit 32.

A connection screw 341, for example an electrically conductive screw, is adapted to fix the conductive column 340 (that is, the connection stretch thereof) to the cover 22 by crossing the lower wall thereof, to lead into the housing seat of the electronic control circuit 32 to be electrically connected to one of the electrical terminals thereof (that is, to the second electrical terminal thereof).

In practice, the head of the connection screw 341 (placed in the inner volume of the casing 20) is in direct electrical contact with the conductive column 340 and the tip of the connection screw 341 (placed outside the inner volume of the casing and in-side the housing seat of the electronic control circuit 32) is electrically connected to one of the electrical terminals thereof (that is, to the second electrical terminal thereof).

Alternatively, as shown in the second and in the third embodiments of FIGS. 7-15, the conductive foil 340 is arranged (completely) inside the stem 31 (that is the longitudinal rod 311), preferably incorporated therein and separated (radially and) electrically from the conductive column 330 (or emerging from the stem 31).

In this second and third embodiment of FIGS. 7-15, the lower end of the conductive foil 340 is fixed in a stable (and conductive) manner to the first body 345 (where provided) or defines itself the first aforesaid body.

For example, the lower end of the conductive foil 340 is fixed by (conductive) welding or (conductive) gluing or other permanent or semi-permanent (or at the limit removable/releasable) fixing system, to the first body 345.

Furthermore, it is not excluded that the first body 345 can be made in a single body the conductive foil 340, that is the first body 345 itself defines the lower end of the conductive foil 340.

In fact, in each embodiment, the conductive foil 340 extends axially upwards the intermediate electrical contact 34 up to the upper constrained end of the stem 31, or up to the electronic control circuit 32. The fuel filter 10 comprises, with particular reference to FIGS. 2, 3 and 4, as well as 7, 8, 12-15, a water separator element indicated as a whole with number 40, which may also be protected independently from that described above, and is configured to separate or promote the separation of water from the fuel and to promote the decanting thereof (that is, the positioning thereof in the collection chamber 26).

Figure 15:
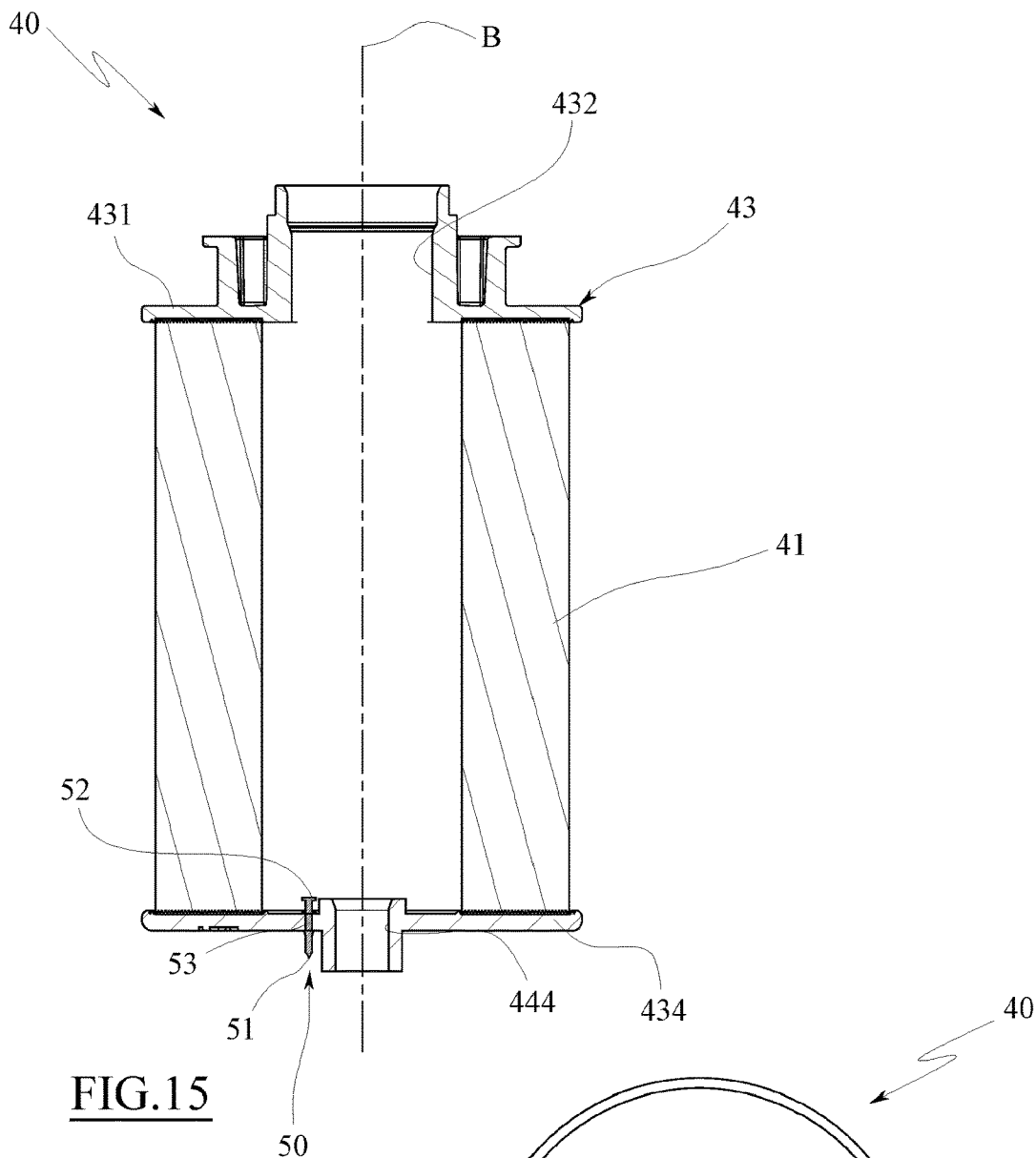
FIG. 15 is a section view along the section plane XV-XV of FIG. 14.
Figure 14:
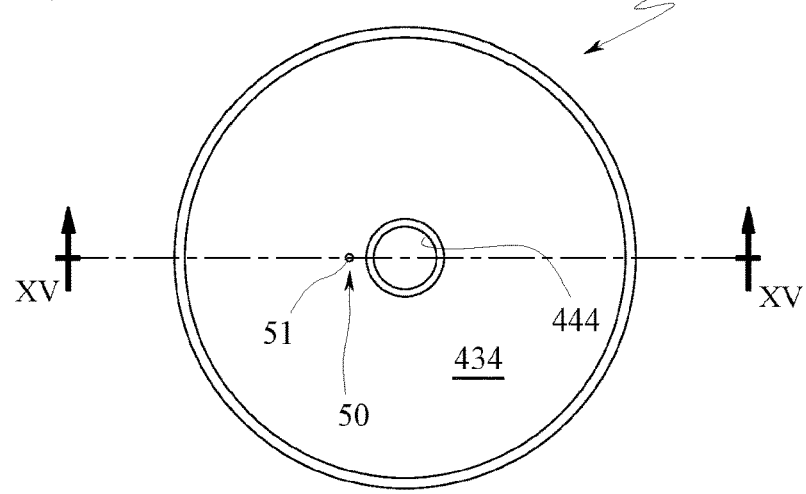
FIG. 14 is a plan view from below of a third embodiment of a water separator element according to the invention.

The water separator element 40 is illustrated in FIGS. 1-6 in a first embodiment thereof which is adapted to be particularly (but not limitedly) used with the first embodiment of the water level sensor 30 (shown in the same figures); it is illustrated in FIGS. 7-12 in a second embodiment thereof which is adapted to be particularly (but not limitedly) used with the second embodiment of the water level sensor 30 (shown in the same figures); and it is illustrated in FIGS. 13-15 in a third embodiment which is adapted to be particularly (but not limitedly) used with the third embodiment of the water level sensor 30 (shown in the same figures).

The water separator element 40 is incorporated in (or consists of) a replaceable filter cartridge, that is, a filter cartridge that once used up to exhaustion, can be replaced with a new (identical) cartridge to restore the complete functionalities of the fuel filter 10.

The water separator element 40 is adapted to be inserted into the inner volume of the casing 20, thus separating the same into two separate environments, of which a first environment (dirty side) communicating with the inlet duct 23, that is, placed up-stream of the water separator element 40 in the flow direction of the fuel from the in-let duct 23 to the outlet duct 24, and a second environment (clean side) communicating with the outlet duct 24, that is, placed downstream of the water separator element 40 in the flow direction of the fuel from the inlet duct 23 to the outlet duct 24.

According to a preferred embodiment, the water separator element 40 comprises a filtering element adapted to be (radially) crossed by the fuel that enters the inner volume of the casing 20 through the inlet duct 23 and leaves through the outlet duct 24.

The filtering element globally has a substantially tubular shape, for example substantially cylindrical or toroidal (axisymmetric) that develops about a longitudinal central axis B (of symmetry).

Preferably, the filtering element is inserted into the inner volume of the casing 20 so as to circumferentially surround at least an axial portion of the water level sensor 30, as is more apparent below. For example, the filtering element is arranged inside the casing 20 substantially coaxial to the water level sensor 30, that is, with the longitudinal central axis B thereof coinciding with the longitudinal axis A of the water level sensor 30.

In practice, the filtering element has an upper end close to the cover 22 and a lower end close to the bottom of the cup-like body 21, preferably placed at a predetermined distance therefrom, for example greater than or equal to the predetermined distance from the bottom of the cup-like body 21 at which the electrical water level contact 33 of the water level sensor 30 is.

The filtering element preferably comprises a filtering septum 41 for filtering the particulate (that is, the solid or semi-solid particles defined as impurities of the fuel) in the fuel.

The filtering septum 41 is tubular-shaped (globally cylindrical) with a star-like cross section (when the filtering septum 41 is a pleated type septum) or substantially annular cross section (when the filtering septum 41 is a depth type septum), and develops about the central longitudinal axis B.

The filtering septum 41 has a substantially (slightly) smaller outer diameter than the inner diameter of the casing 20, so that a gap is defined outside the filtering septum 41, which in the first embodiment of FIGS. 1-6 is for example is such as to define at least part of the aforesaid first environment (dirty side), while in the second and third embodiment of FIGS. 7-15 for example it is such as to define at least part of the aforesaid second environment (clean side).

The inner diameter of the filtering septum 41 is (abundantly) greater than the outer diameter of the water level sensor 30 so that a substantially cylindrical inner cavity is defined in the filtering septum 41 (that is, between the inner wall thereof and the outer wall of the water level sensor 30), which cavity in the first embodiment of FIGS. 1-6 for example is such as to define at least part of the aforesaid second environment (clean side) while in the second and third embodiment of FIGS. 7-15 for example it is such as to define at least part of the aforesaid first environment (dirty side).

The filtering septum 41 may (also) be of the coalescent type so as to improve the separation of the water from the gas oil.

Alternatively, it is possible for a coalescent septum to be fitted on the filtering septum 41, for example axial thereto (outside or inside), preferably in contact with a wall thereof.

According to a first preferred embodiment shown in FIGS. 1-6, the filtering element comprises a hydrophobic mesh 42 (or final separator septum) for the final separation of the water from the fuel.

In practice, the hydrophobic mesh 42 is adapted to be (radially) crossed by the fuel and to stop the water therein contained to guide it, by gravity, into the collection chamber 26.

The hydrophobic mesh 42 is tubular-shaped (globally cylindrical), preferably having a thin wall, developing about the central longitudinal axis B.

In practice, the hydrophobic mesh 42 is coaxial to the filtering septum 41, for exam-ple at a distance therefrom that is not null.

In the second and third embodiment (FIGS. 7-15), the function of separating the water and/or the hydrophobic mesh can for example be integrated into the filtering septum 41, which (in addition to having coalescent power) also allows the effective separation of water and the fall thereof into the collection chamber 26.

On the other hand, where a hydrophobic mesh is present, it would be arranged out-side the filtering septum 41 (for example supported by a suitable outer support candle), preferably coaxially with (and at a distance from) the filtering septum itself.

A gap is defined between the filtering septum 41 and the hydrophobic mesh which mesh is placed in communication with the collection chamber 26 by means of at least one drainage opening the function and architecture thereof will be better de-scribed below with reference to the first embodiment of FIGS. 1-6 in which it is illustrated.

According to an implementing embodiment illustrated in the first embodiment of FIGS. 1-6, the filtering element is crossed (radially) from the outside towards the in-side.

Here, the inlet duct 23 from which the fuel to be filtered enters, is a peripheral (or outer) duct, that is, that leads into the casing 20, that is of the cover 22, in a peripheral area thereof (close to the side wall thereof), or in any case in fluid communication with the environment radially interposed between the filtering element and the inner wall of the casing 20, while the outlet duct 24, from which the filtered fuel leaves, is defined by a central (or inner) duct, preferably by a cylindrical end stretch 24' (see first embodiment of FIGS. 1-6), that is, that leads centrally into the casing 20, that is of the cover 22 (coaxially with the filtering element).

Moreover, in this case the hydrophobic mesh 42 (in the first embodiment of FIGS. 1-6) is in the filtering septum 41 so as to divide the inner cylindrical chamber therein defined into two chambers, of which an annular chamber external to the hydrophobic mesh 42 and internal to the filtering septum 41, and an inner cylindrical chamber (directly communicating with the outlet duct 24) that is internal to the hydrophobic mesh itself.

In the embodiment illustrated in FIGS. 1-6, the hydrophobic mesh 42 has an outer diameter that is (abundantly) smaller than the inner diameter of the filtering septum 41 so that the hydrophobic mesh 42 is at a distance (not null) from (the inner wall) of the filtering septum 41 and a gap is defined therebetween, which is for example such as to define the aforesaid outer annular chamber.

According to a preferred embodiment implementing the first embodiment (see FIGS. 1-6), the inner diameter of the hydrophobic mesh 42 is greater than the outer diameter of the water level sensor 30 so that a substantially toroidal gap such as to define the aforesaid inner cylindrical chamber, is defined in the hydrophobic mesh 42 (that is, between the inner wall thereof and the outer wall of the water level sensor 30).

According to an alternative implementing embodiment illustrated in the second and in the third embodiment of FIGS. 7-15, the filtering element is crossed (radially) from the outside towards the inside.

Here, the inlet duct from which the fuel to be filtered enters, is defined by the central (or inner) duct, preferably from an end stretch of the inlet duct 23 defined by the sleeve 310 (see second and third embodiment of FIGS. 7-15), which leads centrally into the casing 20, that is of the cover 22 (coaxially with the filtering element); the outlet duct 24 from which the filtered fuel leaves is instead the peripheral (or outer) duct, that is, that leads into the casing 20, that is of the cover 22, into a peripheral area thereof (close to the side wall thereof) or in any case in fluid communication with the environment radially interposed between the filtering element and the inner wall of the casing 20.

According to such a second and third embodiment (see FIGS. 7-15), the inner diameter of the filtering septum 41 is greater than the outer diameter of the water level sensor 30 so that a substantially toroidal gap such as to define the aforesaid inner cylindrical chamber, is defined in the filtering septum 41 (that is, between the inner wall thereof and the outer wall of the water level sensor 30).

The water separator element 40 (in all the implementing embodiments of FIGS. 1-15) also comprises a support for the filtering element.

In a preferred embodiment shown in the drawings, the filtering element support is made (in all components thereof) of an electrically insulating (dielectric) material, for example of a plastic material (for example, a polyamide-based material—PA—or a polyethylene-based material—PBT).

In an alternative embodiment, the filtering element support could be made (all components thereof) of electrically conductive material. In this case, the filtering element support could be made of a conductive plastic (for example, a conductive polymer and/or a conductive composite material, such as for example, having a polymeric matrix—for example aliphatic polyamide-based—and a carbon-based reinforcement—such as for example, carbon nanotubes and/or carbon black) or of a metal (or a metal alloy) or a combination thereof.

In the first embodiment shown in FIGS. 1-6, the filtering element support preferably comprises a support of the filtering septum 43 configured to support the filtering septum 41.

The filtering septum support 43 preferably comprises an upper plate 431 irremovably fixed (for example, by heat sealing or gluing) to an upper end of the filtering septum 41.

The upper plate 431 is substantially annular and has an upper central hole 432 centered on the longitudinal central axis B of the filtering element, that is, of the filtering septum 41.

A receiving seat in which an upper annular gasket 433 is received, is provided in the upper central hole 432.

According to a preferred embodiment, the inner diameter of the upper central hole 432 is greater than the outer diameter of the water level sensor 30 so that the latter may be axially inserted into the upper central hole 432 itself, preferably with (abundant) radial clearance.

The upper central hole 432 of the upper plate 431 (of the filtering septum support 43) is fitted on the cylindrical end stretch 24' in the outlet duct 24 in which the upper end of the stem 31 of the water level sensor 30 is received (coaxially and with radial clearance).

In practice, by fitting the upper central hole 432 of the upper plate 431 onto the inner cylindrical end stretch 24' of the outlet duct 24, the coaxial centering is obtained be-tween the water level sensor 30 and the filtering element, that is, the filtering septum 41.

The upper annular gasket 433 is adapted to be (radially) compressed between the inner cylindrical end stretch 24' of the outlet duct 24 and the inner edge of the upper central hole 432 of the upper plate 431, so that the substantially cylindrical inner cavity (that defines the second environment) communicates with the outlet duct 24 and is hydraulically sealingly separated from the first environment, that is, from the inlet duct 23.

The filtering septum support 43 preferably comprises a lower plate 434 irremovably fixed (for example, by heat sealing or gluing) to a lower end of the filtering septum 41.

In the embodiment shown, the lower plate 434 is substantially annular and has a lower central hole 435 centered on the longitudinal central axis B of the filtering element, that is, of the filtering septum 41.

The inner diameter of the lower central hole 435 is for example, greater than or equal to the inner diameter of the upper central hole 432 of the upper plate 431 so that the water level sensor 30 may be inserted axially—with (abundant) radial clearance—(also) into the lower central hole 435 itself.

According to a preferred embodiment, a receiving seat in which a lower annular gasket 436, is received is provided outside the lower plate 434, that is, on the outer jacket thereof.

The lower annular gasket 436 is adapted to be (radially) compressed between the outer jacket of the lower plate 434 and a cylindrical portion of the inner wall of the casing 20, for example of the cup-like body 21, so that the outer gap defined be-tween the inner wall of the casing 20 and the filtering septum 41 (that defines the first environment) communicates (explicitly) with inlet duct 23 and is hydraulically sealingly separated from the second environment, that is, the outlet duct 24.

The filtering septum support 43 in the example illustrated comprises an outer longitudinal candle 437, which is inserted (to measure) into the inner cavity of the filtering septum 41, in fact internally wrapping the same.

The outer longitudinal candle 437 for example, comprises a tubular body having diameter substantially equal to the inner diameter of the filtering septum 41, which is provided with a plurality of radial through openings.

The outer longitudinal candle 437 in the example is placed coaxially and in the filtering septum 41 and is fixed (irremovably, for example by gloating or heat sealing), at an upper end thereof, to the upper plate 431 and, at a lower end thereof, to the lower plate 434.

For example, the outer longitudinal candle 437 comprises an annular shelf 438 (preferably provided with one or more seats open at the top towards the upper plate 431) protruding in radial inwards direction, which is placed close to the upper end of the outer longitudinal candle 437 itself and which is axially overlapped (at axial distance not equal to null) by a central portion of the upper plate 431 (that surrounds the upper central hole 432).

In this first embodiment (FIGS. 1-6), the filtering element support further comprises a support of the hydrophobic mesh 44 configured to support the hydrophobic mesh 42.

The hydrophobic mesh support 44 may be irremovably associated with the filtering septum support 43, as illustrated in the example, or be removably associated there-with, for example by means of a snap hook or other type of hook or connection.

Moreover, the hydrophobic mesh support 44 may be associated with the filtering septum support 43 so that there is no degree of mutual freedom therebetween, that is so as to be rigidly connected (as in the example illustrated), or they may be mutually connected so as to allow the mutual movement at least with respect to a level of freedom, for example rotational about the longitudinal central axis B.

The hydrophobic mesh support 44 preferably comprises an inner longitudinal candle 441, which is inserted (to measure) inside and/or outside the inner cavity of the hydrophobic mesh 42, in fact wrapping the same.

The inner longitudinal candle 441 for example, comprises a tubular body having diameter substantially equal to the inner diameter of the hydrophobic mesh 42, which is provided with a plurality of radial through openings.

The inner longitudinal candle 441 in the example is placed coaxially and in the hydrophobic mesh 42 and is fixed (irremovably, for example by co-molding, gluing or heat sealing) thereto.

The inner longitudinal candle 441 has an open upper end from which one or more teeth 442 (or an annular edge for its whole extension) radially derive outwards, the teeth being adapted to be interposed between the annular shelf 438 of the outer longitudinal candle 437 and the inner (lower) face of the upper plate 431 (for example, received in a respective seat of the annular shelf 438 open at the top) to be substantially clamped therein (and with no possibility of rotating).

The hydrophobic mesh support 44 also comprises a lower plate 443 which is irremovably fixed to the lower end of the inner longitudinal candle 441 (for example, fixed thereto by heat sealing or gluing or made in a single body therewith).

The lower plate 443 of the hydrophobic mesh support 44 is substantially annular and has a through opening 444 (see FIG. 3) centered on the longitudinal central ax-is B of the filtering element, that is of the hydrophobic mesh 42.

The through opening 444 is preferably circular or in any case has a shape that is substantially complementary to the shape of a cross section (orthogonal to the longitudinal axis A) of the water level sensor 30, preferably made in the (tapered) closing cap 311 thereof.

The inner diameter of the through opening 444 is less than or equal to (or at the limit, slightly greater than) the (maximum) outer diameter of the water level sensor 30 so that at least an axial portion of the latter may be axially inserted into the through opening 444 thereof (from the lower free end of the stem 31).

Preferably, at least the electrical water level contact 33 of the water level sensor 30 is configured to axially cross the through opening 444 when the water separator element 40 is fitted on (the stem 31 of) the water level sensor itself.

For example, the inner diameter of the through opening 444 is an intermediate diameter between the minimum diameter and the maximum diameter of the water level sensor, in other words, it is less than the maximum outer diameter of the water level sensor 30, that is of the cylindrical stretch 310 thereof, and is greater than the mini-mum outer diameter thereof, that is, the minimum diameter of the (conical) closing cap 311, that is, of the free end of the water level sensor itself.

The water level sensor 30 therefore is adapted to be axially inserted, with the lower free end thereof, into the through opening 444 up until the outer wall of the water level sensor 30, that is, of the portion of (conical) closing cap 311 having the same diameter as the through opening 444, abuts against the inner wall of the through opening 444, thus defining a closing element for the through opening itself.

When the outer wall of the water level sensor 30 abuts against the inner wall of the through opening 444, the electrical water level contact 33 of the water level sensor 30 is at the bottom of the lower plate 443 of the hydrophobic mesh support 44 (or at the same level as it) and preferably, at the bottom of the lower plate 434 of the filtering septum support 43 (in the collection chamber 26).

At the same time, the intermediate electrical contact 34 of the water level sensor 30 is instead in the inner cylindrical chamber (directly communicating with the outlet duct 24 in the first embodiment illustrated in FIGS. 1-6, wherein the filtering element is crossed radially from the outside towards the inside) circumscribed by the hydrophobic mesh 42 (where provided), that is it is axially interposed between the opposite ends of the filtering element (that is, the opposite ends of the hydrophobic mesh 42 and/or of the filtering septum 41).

In other words, a connection portion 35 (identified between two dotted lines L1 and L2 in FIGS. 2 and 6) of the water level sensor 30 that is axially interposed between the electrical water level contact 33 and the intermediate electrical contact 34 (and separated thereby, that is made on the portion of stem 31 that sets apart and physically and electrically separates the electrical water level contact 33 and the intermediate electrical contact 34) is inserted to measure into the through opening 444 when the outer wall of the water level sensor 30 abuts against the inner wall of the through opening 444.

In practice, the connection portion 35 of the water level sensor 30 has an outer diameter that is substantially equal to the inner diameter of the through opening 444.

A seal connection is thus defined between the water level sensor 30 and the through opening 444, which connection is—in the example illustrated—obtained by means of the forced connection (plastic on plastic) by interference between the outer wall of the water level sensor 30 (that is, the outer wall of the closing cap 311, at the connection portion 35) and the inner wall of the through opening 444.

The seal connection could be of radial type (that is, exerted by means of a compression mainly in radial direction) or of axial type (that is, exerted by means of a com-pression mainly in axial direction).

Alternatively or additionally, the seal connection between the water level sensor 30 and the through opening 444 could be made by means of a gasket element.

In this case, a receiving seat could be provided in the through opening 444 (or outside the water level sensor 30), in which seat a lower annular gasket (not shown) is received, adapted to be compressed (preferably radially, but it is not excluded for it to be axially compressed) between the outer wall of the water level sensor 30 (that is, the outer wall of the closing cap 311) and the inner wall of the through opening 444.

Preferably (but not limitedly) in the first embodiment (of FIGS. 1-6), the filtering element support in general can comprise a guide body 445 (see FIG. 3) configured to guide and lead the water level sensor 30 in in order to enter the through opening 444.

Figure 3:
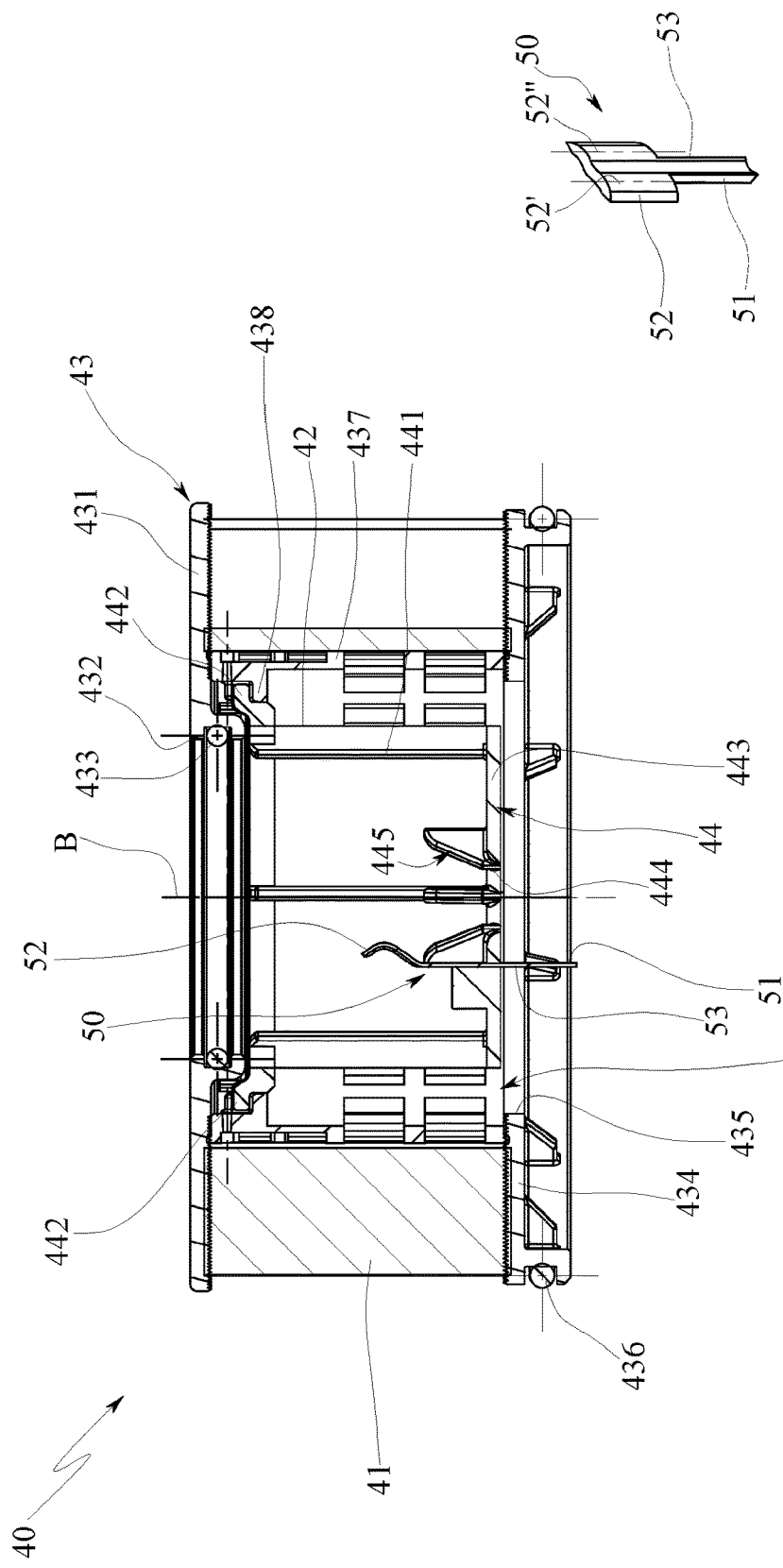
FIG. 3 is a section view of a first embodiment of a water separator element according to the invention.
Figure 4:
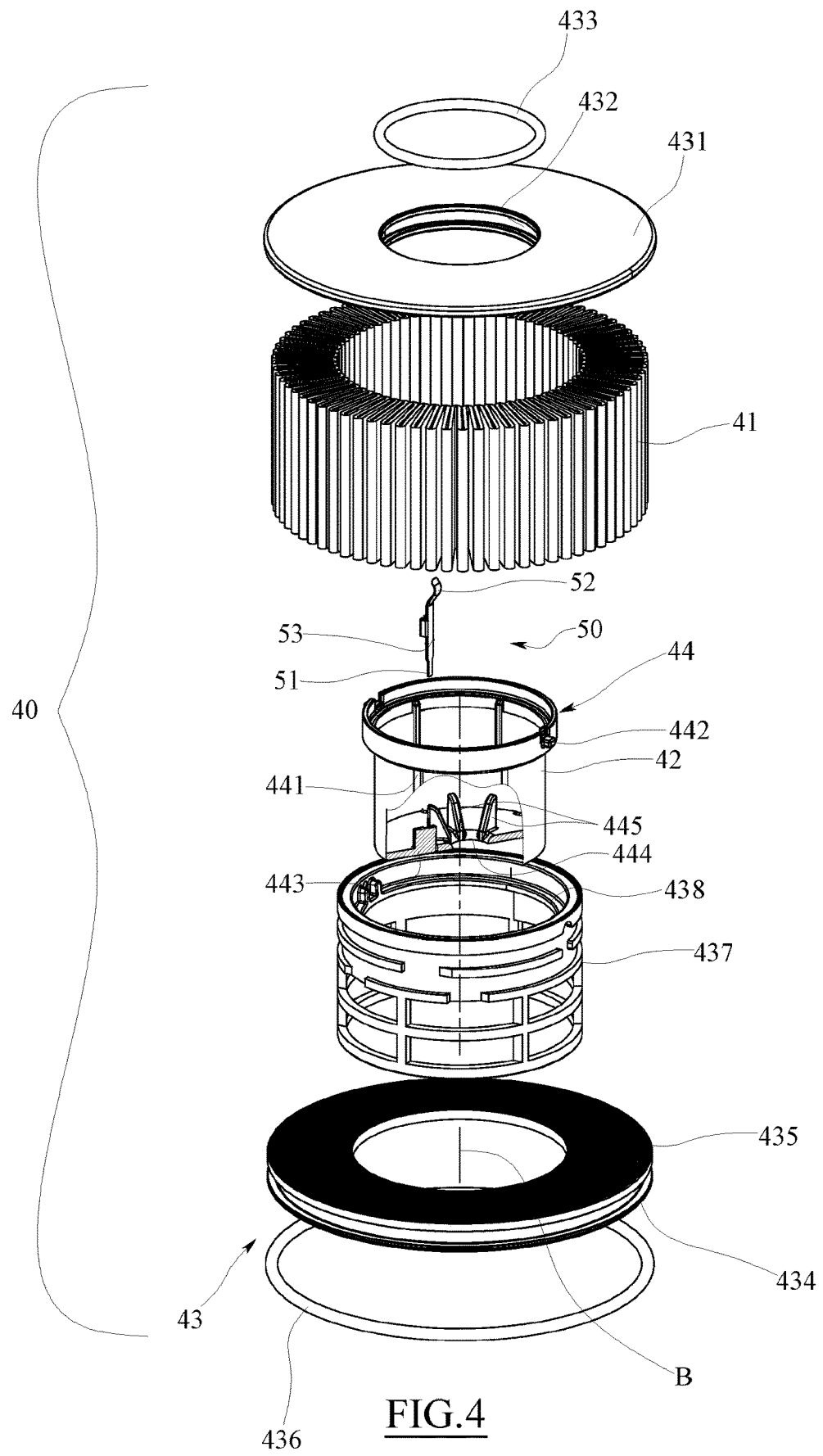
FIG. 4 is an exploded view of the water separator element in FIG. 3.

In the first embodiment shown in FIGS. 1-6, the lower plate 443 of the hydrophobic mesh support 44 (or more generally, the hydrophobic mesh support 44) comprises the aforesaid guide body 445 (see FIG. 3).

It is not excluded for such guide body 445 to be provided on the lower plate 434 of the filtering septum support 43. The guide body 445 is defined in the inner cylindrical chamber of the filtering element, for example it is defined in the example of the hydrophobic mesh 42 at the top of the lower plate 443 of the hydrophobic mesh support 44 (and at the bottom of the open free end of the inner longitudinal candle 441).

In a first embodiment shown in FIGS. 1-6, the guide body 445 comprises a plurality of projections or fins rising from the upper face of the lower plate 443 of the filtering element support, that is, of the hydrophobic mesh support 44, and separate from one another, for example equally spaced from one another and radially arranged about the through opening 444.

Each projection has an inner side, that is, facing towards the longitudinal central ax-is B, that lies on a conical surface (complementary to the conical stretch of the water level sensor 30) that converges towards the through opening 444 that is common to all projections.

In practice, the inner sides of each projection define a conical surface (discontinuous at stretches) that converges (from above) towards the through opening 444 and therefore, guides the free end (that is, the conical closing cap 311) of the water level sensor 30 to be arranged coaxially in the through opening 444 following mutually approaching axial translation.

Alternatively, it is not excluded for the guide body 445 to be made from a single conical (concave) projection rising from the upper face of the lower plate 443 of the filtering element support, in particular of the hydrophobic mesh support 44, about the through opening 444, or from a conical profile made in the inner wall of the through opening 444 itself.

Again, the outer diameter of the lower plate 443 of the hydrophobic mesh support 44 is (abundantly) less than the inner diameter of the lower plate 434 of the filtering septum support 43.

The lower plate 443 of the hydrophobic mesh support 44 may also substantially be coplanar to the lower plate 434 of the filtering septum support 43 or the lower plate 443 of the hydrophobic mesh support 44 is slightly closer to the upper plate 431 with respect to the lower plate 434 of the filtering septum support 43, as illustrated in the example.

Preferably (but not limitedly) in this first embodiment (FIGS. 1-6), the filtering element support, that is the lower plate 443 of the hydrophobic mesh support 44 and/or the lower plate 434 of the filtering septum support 43, defines a drainage opening 45 (see FIGS. 2 and 3), which is configured to allow the sedimentation of the water that is separated from the fuel and the draining thereof into the collection chamber 26.

The drainage opening 45 is defined at the outer annular chamber, that is, axially aligned and arranged at the bottom thereof.

In practice, the drainage opening 45 is adapted to put the outer annular chamber (in which the second environment is divided) radially interposed between the filtering septum 41 and the hydrophobic mesh 42, into fluid communication with the water collection chamber 26 and therefore, to allow the water to be separated from the fuel in such outer annular sedimentation chamber in the collection chamber 26 itself.

Therefore, the collection chamber 26 is in fact a portion of the second environment in which the inner volume of the casing 20 is divided by the water separator element 40, more particularly a part of the portion of second environment placed downstream of the filtering septum 41 and upstream of the hydrophobic mesh 42 in the crossing direction of the fuel from the inlet duct 23 to the outlet duct 24, that is it is a (lower) part thereof; in other words, the part thereof close to the bottom of the casing 20.

In the example illustrated, the drainage opening 45 is defined by an annular gap interposed between the lower plate 443 of the hydrophobic mesh support 44 and the lower plate 434 of the filtering septum support 43, which are radially and/or axially separated from each other.

Moreover, it is not excluded for the lower plate 443 of the hydrophobic mesh support 44 to be made in a single body with the lower plate 434 of the filtering septum sup-port 43; in such case, the drainage opening for the water may be defined by one or more eccentric through holes through said single body made at the outer annular chamber defined radially between the filtering septum 41 and the hydrophobic mesh 42.

In the example illustrated, the fuel that enters the casing 20 from the inlet duct 23 (radially) crosses the water separator element 40 (from the outside inwards), that is first it crosses the filtering septum 41 and then the hydrophobic mesh 42, to then leave (filtered and separated from the water that accumulates in the collection chamber 26) from the outlet duct 24.

In the second and third embodiment shown in FIGS. 7-15, the filtering element support preferably comprises a filtering septum support 43 configured to support the filtering septum 41 (which as said performs the coalescent and/or separation function of the water from the fluid being filtered).

The filtering septum support 43 preferably comprises an upper plate 431 irremovably fixed (for example, by heat sealing or gluing) to an upper end of the filtering septum 41.

The upper plate 431 is substantially annular and has an upper central hole 432 centered on the longitudinal central axis B of the filtering element, that is, of the filtering septum 41.

Inside the upper central hole 432 an upper annular gasket is housed which is fitted (and axially retained) in an annular seat formed outside the stem 31, that is the sleeve 310 of the stem 31, of the water level sensor 30.

According to a preferred embodiment, the inner diameter of the upper central hole 432 is greater than the (maximum) outer diameter of the water level sensor 30 (that is of the sleeve 310) so that the latter may be axially inserted into the upper central hole 432 itself, preferably with (abundant) radial clearance.

The upper central hole 432 of the upper plate 431 (of the filtering septum support 43) is fitted on the sleeve 310 of the stem 31, within which the longitudinal rod 311 of the water level sensor 30 is derived (coaxially and with radial clearance) which ex-tends into the filtering septum 41.

In practice, by fitting the upper central hole 432 of the upper plate 431 on the sleeve 310 of the stem 31, the coaxial centering is obtained between the water level sensor 30 and the filtering element, that is the filtering septum 41.

The upper annular gasket is adapted to be (radially) compressed between the sleeve 310 and the inner edge of the upper central hole 432 of the upper plate 431, so that the substantially cylindrical inner cavity (that defines the first environment) communicates with the inlet duct 23 and is hydraulically sealingly separated from the second environment, that is, from the outlet duct 24.

Moreover, the upper plate 431 can provide for a cylindrical or appropriately shaped shank which surrounds the upper central hole 432 (for example by extending it superiorly and/or inferiorly in the axial direction).

The filtering septum support 43 then comprises a lower plate 434 unreleasably fixed (for example, by heat sealing or gluing) to a lower end of the filtering septum 41.

In the embodiment shown, the lower plate 434 is substantially annular and has a through opening 444 centered on the longitudinal central axis B of the filtering element, that is, of the filtering septum 41.

The through opening 444 is preferably circular or in any case has a shape that is substantially complementary to the shape of a cross section (orthogonal to the longitudinal axis A) of the water level sensor 30 (in particular of at least one section of the longitudinal rod 311).

The inner diameter of the through opening 444 is smaller than or equal to (or at the limit, slightly greater than) the (maximum) outer diameter of the (longitudinal rod 311 of the) water level sensor 30 so that at least one axial portion of the latter may be axially inserted into the through opening 444 itself (from the lower free end of the longitudinal rod 311 of the stem 31).

Preferably, at least the electrical water level contact 33 of the water level sensor 30 is configured to axially cross the through opening 444 when the water separator element 40 is fitted on (the stem 31 of) the water level sensor itself.

The water level sensor 30 (that is the lower end of the longitudinal rod 311 of the stem 31) is adapted to fit axially with the lower free end thereof into the through opening 444 until the lower annular gasket 3110 provided on the longitudinal rod 311, having the same diameter as the through opening 444, is compressed radially against the inner wall of the through opening 444, thus defining a closing (sealing) element for the through opening itself.

When the lower annular gasket 3110 is compressed against the inner wall of the through opening 444, the electrical water level contact 33 of the water level sensor 30 is located at the bottom of the filtering septum 41, preferably at the bottom of the lower plate 434 of the filtering septum support 43 (in the collection chamber 26).

At the same time, the intermediate electrical contact 34 of the water level sensor 30 is instead located in the inner cylindrical chamber (directly communicating with the inlet duct 23—through the sleeve 300—in the second and third embodiment of FIGS. 7-15, in which the filtering element is crossed radially from the inside towards the outside) circumscribed by the filtering septum 41, that is it is axially interposed between the opposite ends of the filtering element (that is the opposite ends of the filtering septum 41).

In other words, a connection portion of the water level sensor 30 which is interposed axially between the electrical water level contact 33 and the intermediate electrical contact 34, that is between the electrical water level contact 33 and the retaining element 350 (and separated therefrom, that is formed on the longitudinal rod portion 311 of the stem 31 which distinguishes and physically and electrically separates the electrical water level contact 33 and the intermediate electrical contact 34) is inserted to measure in the through opening 444 when the lower annular gasket 3110 of the water level sensor 30 abuts (or is tightened) against the inner wall of the through opening 444.

A sealing connection is therefore defined between the water level sensor 30 and the through opening 444, which—in the example illustrated—is realized by means of the lower annular gasket 3110 (of the o-ring type).

The seal connection could be of radial type (that is, exerted by means of a compression mainly in radial direction) or of axial type (that is, exerted by means of a compression mainly in axial direction).

Moreover, the retaining element 350—when defined by an elastically deformable element—can itself exert an (adjuvant) action for sealing the connection between the stem 31 (that is the longitudinal rod 311) and the through opening 444.

The filtering septum support 43 can also comprise an inner longitudinal candle, which is inserted (to measure) inside the internal cavity of the filtering septum 41, de facto internally wrapping the same. The water separator element 40 particularly comprises a (single) conductive element 50 provided on the filtering element support, that is rigidly fixed thereto or integrally made therewith, preferably to the lower plate 443 of the hydrophobic mesh support 44 and/or to the lower plate 434 of the filtering septum support 43 and/or to one of the longitudinal candles (inner 441 or outer 437).

The conductive element 50, in the example shown in the first embodiment illustrated of FIGS. 1-6, is fixed to the hydrophobic mesh support 44, preferably to the lower plate 443 of the hydrophobic mesh support 44 itself, as will better appear in the following.

However, it is not excluded that the conductive element 50, as it is instead illustrated in the second and third embodiment of FIGS. 7-15, can be fixed to the filtering septum support 43, preferably to the lower plate 434 thereof.

The conductive element 50 is completely (that is in all components thereof) made of an electrically conductive material.

In a first variant for example, the conductive element 50 is made of a metal (such as steel, preferably stainless steel, aluminum or copper) or a metal alloy.

In a second variant, the conductive electrode 50 may be made of a conductive plastic (for example, a conductive polymer and/or a conductive composition material) or of a metal (or a metal alloy).

It is therefore possible to have different configurations of the water separator element 40 as a function of the chemical nature of the filtering element support and of the conductive element 50.

A first possible configuration could provide for the filtering element support to be made of an electrically insulating (dielectric) material.

Here, the conductive element 50 may be made of metal, for example fixed to (inserted into or in some manner joined to or incorporated in or co-molded with) the filtering element support or alternatively, the conductive element 50 may be made of a conductive plastic, for example formed integrally with the filtering element support (for example, by co-molding) or fixed to (inserted into or in some manner joined to or incorporated in) the filtering element support itself.

A second possible configuration could provide for the filtering element support to be made of an electrically conductive material.

Here, it is possible to make both the filtering element support and the conductive electrode 50 with the same material (or with the same class of materials).

For example, the filtering element support and the conductive electrode 50 may be made with a conductive plastic, for example the same conductive plastic or a different conductive plastic, or it is possible to make the filtering element support and the conductive electrode with metal, for example the same metal or different metal.

Moreover, here it is possible for the conductive element 50 to be formed integrally with the filtering element support, that is for it to be a monolithic body.

Within the scope of the aforesaid second configuration, it is also possible to make both the filtering element support and the conductive electrode 50 with a different material (or a different class of materials).

Here, it is possible to provide for the filtering element support to be made with a conductive plastic or with metal and respectively, the conductive electrode 50 with a metal or with a conductive plastic.

Moreover, here it is possible for the conductive element 50 to be formed integrally with the filtering element support (for example, by co-molding) or for it to be fixed thereto (inserted or in some manner joined or incorporated).

As is more apparent below, the conductive element 50 in general is adapted to be electrically connected to the intermediate electrical contact 34 of the water level sensor 30 to (axially) extend the same towards the water collection chamber 26.

The conductive element 50 is defined by a (monolithic) body that is elongated along a longitudinal axis (mainly parallel to the longitudinal central axis B).

In practice, the conductive element 50 defines an extension of the intermediate electrical contact 34 of the water level sensor 30 and therefore, of the electronic control circuit of the water level sensor 30, that electrically interconnects the intermediate electrical contact 34 with the fluid (fuel or water) contained in the collection chamber 26.

Preferably, the conductive element 50 is positioned in an eccentric position of the filtering element support with respect to the longitudinal central axis B thereof.

The conductive element 50 is incorporated in (or consisting of) an elongated body (according to a longitudinal axis parallel to the central longitudinal axis B of the water separator element) made of an electrically conductive material, for example a conductive strip or conductive foil or conductive nail or cylinder, which strip is preferably thin, narrow and elongated, such as for example illustrated in the first embodiment of FIGS. 1-6 or in the third embodiment of FIGS. 13-15.

Alternatively, the conductive element 50 is incorporated in (or consisting of) a tubular body extending about a central axis (parallel to the central longitudinal axis B of the water separator element) made of an electrically conductive material, for example a conductive bushing, which is preferably thin, narrow and elongated, as for example illustrated in the second embodiment of FIGS. 7-12.

The conductive element 50 comprises a water level electrode 51 configured to extend directly into the collection chamber 26, that is to lead into and be arranged therein.

Water level electrode means a surface of the conductive element 50, that is, of the conductive strip or foil or conductive nail or cylinder or of the conductive bushing forming it, from which the filtering element support (the plastic or the material with which it is made) emerges or protrudes and is adapted in use, to be immersed into (or wetted by) the fluid being filtered, that is, into the fuel and/or water that accumulates in the collection chamber 26, in direct contact therewith, so as to define a probe immersed in the fluid.

In practice, the water level electrode 51 is intended in use (in particular, when the water separator element 40 is correctly inserted into the casing 20 and is fitted on the water level sensor 30) to be arranged inside the collection chamber 26.

The water level electrode 51 is defined by a lower end portion of the conductive element 50 (or of the lower end thereof, or of the area thereof close to the bottom of the casing 20, when the water separator element 40 is inserted therein).

The water level electrode 51 surfaces (substantially coplanar) or protrudes (axially downwards) from the lower face of the filtering element support, in particular of the lower plate 443 of the hydrophobic mesh support 44 (see the first embodiment of FIGS. 1-6) and/or of the lower plate 434 of the filtering septum support 43 (see the second and third embodiment of FIGS. 7-15) and/or from one of the longitudinal candles (inner 441 or outer 437).

In the example illustrated in FIGS. 1-6, the water level electrode 51 protrudes (axially downwards) from the lower face of the lower plate 443 of the hydrophobic mesh support 44.

In the example illustrated in FIGS. 7-15, the water level electrode 51 protrudes (axially downwards) from the lower face of the lower plate 434 of the filtering septum support 43.

Preferably, the water level electrode 51 protrudes axially downwards past the lower end of the filtering element, that is of the filtering septum 41 (and of the hydrophobic mesh 42), preferably by an axial stretch of length not equal to null, and in fact it actually extends the water separator element 40 downwards.

The water level electrode 51 (that is the free lower end thereof, the most distal from the filtering element or from the body from which it derives, that is the lower plate 443 or 434 or the longitudinal candle 441 or 437) is placed at a predetermined distance (not null) from the bottom of the cup-like body 21 when the water separator element 40 is placed in the casing 20 (in the correct installation position thereof), in which such predetermined distance substantially is equal (unless axial tolerances are provided by the mutual connection) to the predetermined distance of the electrical water level contact 33 from the bottom of the cup-like body 21.

The upper end of the water level electrode 51, constrained or joined to the body from which it derives, is placed at a greater distance from the bottom than said predetermined distance, for example greater than the predetermined distance from the bot-tom of the cup-like body 21 at which the upper end of the electrical water level con-tact 33 is.

In practice, the water level electrode 51 develops longitudinally between said upper end (constrained and joined to the body from which it derives, in the example illustrated in FIGS. 1-6 the lower plate 443 of the hydrophobic mesh support 44 and in the examples illustrated in FIGS. 7-15 the lower plate 434 of the filtering septum support 43) and said free lower end, for example along a substantially rectilinear longitudinal development parallel to (and separate from) the longitudinal central axis B of the filtering element (and therefore, parallel to the longitudinal axis A of the water level sensor 30).

The axial length of the water level electrode 51 is, for example, greater (or lower) than the axial length of the electrical water level contact 33 (that is of the portion thereof emerging axially from the stem 31) of the water level sensor 30, it is preferably equal to the sum of the axial length of the protruding portion (at the bottom of the lower plate 443) of the free end of the stem 31 (that is, of the closing cap 311) that crossed the through opening 444 and the axial length of the electrical water level contact 33 (that is, of the portion thereof emerging axially from the stem 31).

The conductive element 50 comprises a contact electrode 52 which is away spaced apart from (that is, positioned in a different axial and/or radial position) the water lev-el electrode 51 and is electrically connected to the water level electrode 51.

Contact electrode means a surface of the conductive element 50, that is of the conductive strip or foil or conductive nail or cylinder or of the conductive bushing forming it, from which the filtering element support (the plastic or the material with which it is made) emerges or protrudes, and is adapted in use, to be placed in (forced) contact with the intermediate electrical contact 34 of the water level sensor 30, thus creating a direct electrical contact between the two, adapted to the passage of an electric current.

The contact electrode 52 is therefore intended to come into direct electrical contact with the intermediate electrical contact 34 of the water level sensor 30, in practice by a putting the intermediate electrical contact 34 of the water level sensor 30 into electrical contact—by means of the electrical connection that connects the contact electrode 52 to the water level sensor 51, which is better described below—with the water level electrode 51 of the water separator element 40.

In the example illustrated in FIGS. 1-6, the contact electrode 52 is (directly) placed in a cylindrical space circumscribed by the filtering element, preferably in the inner cylindrical chamber (directly communicating with the outlet duct 24) that is sur-rounded by the hydrophobic mesh 42.

In practice, in the embodiment shown in FIGS. 1-6, when the water separator element 40 is (correctly) inserted into the casing 20, the contact electrode 52 is arranged in the second environment (clean side) communicating with the outlet duct 24 into which the inner volume of the casing 20 is divided from the water separator element 40 (preferably, but not limited to, the volume thereof placed downstream of the hydrophobic mesh 42 in the crossing direction of the fuel from the inlet duct 23 to the outlet duct 24).

The contact electrode 52 is defined by an upper end portion of the conductive element 50 (or of the upper end thereof, or of the area thereof distal from the bottom of the casing 20, when the water separator element 40 is inserted therein).

The contact electrode 52 surfaces (substantially coplanar) or protrudes (axially upwards) from the upper face of the filtering element support, in particular of the lower plate 443 of the hydrophobic mesh support 44 (see FIGS. 1-6) and/or of the lower plate 434 of the filtering septum support 43 (see FIGS. 7-15).

In the example illustrated in FIGS. 1-6, the contact electrode 52 protrudes (axially upwards) from the upper face of the lower plate 443 of the hydrophobic mesh sup-port 44.

Preferably, the contact electrode 52 is placed in the filtering element, that is in the hydrophobic mesh 42 (see FIGS. 1-6) and/or of the filtering septum 41 (see FIGS. 7-15), in particular the contact electrode 52 is placed (and ends with the upper end thereof) in an axial area that is axially contained between the lower end and the up-per end of the filtering element, that is of the filtering septum 41 (and of the hydrophobic mesh 42).

For example, the contact electrode 52 (that is the free upper end thereof, the most distal from the lower plate or from the body from which it derives) is placed at a pre-determined distance (not null) from the lower plate from which it derives, that is from the lower plate 443 of the hydrophobic mesh support 44 (see FIGS. 1-6) or from the lower plate 434 of the filtering septum support 43, in which such predetermined distance is substantially equal to (unless axial tolerances are provided by the mutual connection) the distance of the intermediate electrical contact 34 from the lower plate itself (from the lower plate 443 of the hydrophobic mesh support 44 or from the lower plate 434 of the filtering septum support 43) when the water level sensor 30 is inserted axially (abutting) into the through opening 444.

In practice, in the first and third embodiments of FIGS. 1-6 and 13-15, the contact electrode 52 develops longitudinally between said free upper end to a lower end constrained and joined to the lower plate (or to the body) from which it derives—in the example the lower plate 443 of the hydrophobic mesh support 44 (see FIGS. 1-6) or the lower plate 434 of the filtering septum support 43 (see FIGS. 13-15)—for example along a longitudinal elongated development that is mainly parallel to (and distinct from) the longitudinal central axis B of the filtering element (and therefore, parallel to the longitudinal axis A of the water level sensor 30).

The axial length of the contact electrode 52 is for example, less than the axial distance between the intermediate electrical contact 34 and the electrical water level contact 33.

In the first embodiment of FIGS. 1-6, at least the contact electrode 52 is preferably elastically deformable.

That is, the conductive element 50 has a given deformability or elastic yielding capacity at least at the contact electrode 52.

In the example illustrated (see FIGS. 1-6), the contact electrode 52 is oriented radially with respect to the longitudinal central axis B, that is, it is defined by a surface of the conductive element 50 oriented radially with respect to the longitudinal central axis B, preferably facing inwards of the filtering element, that is facing towards the longitudinal central axis B.

In practice, the contact electrode 52 is adapted to be arranged at the same axial height in the casing 20 in which the intermediate electrical contact 34 is, and to be radially (at the outside) placed side-by-side a circumferential portion thereof, thus coming into contact in radial direction with the intermediate electrical contact 34 itself.

In this configuration, the contact electrode 52 is preferably elastically deformable in mainly radial direction.

In particular, the contact electrode 52 is configured to bend radially (away from the longitudinal central axis B) if stressed by a thrust having a radial component (away from the longitudinal central axis B) and to exert an elastic reaction to such stress (that is, to exert a radial elastic thrust force approaching the longitudinal central axis B).

In practice, the direct electrical contact between the (rigid) intermediate electrical contact 34 and the (elastically deformable) contact electrode 52 is of the forced type and therefore, is more secure.

Advantageously in the embodiment illustrated, the contact electrode 52 has a curved shape that has a first radially outwards tilted stretch (away from the longitudinal central axis B) which is close to the upper free end of the contact electrode itself.

Such first stretch defines a tilted ramp such as to act as a cam for the contact electrode 52 which when stressed by a thrust direct axially towards the lower plate 443 and acting on such first tilted stretch, is configured to (mainly) radially bend the con-tact electrode 52 away from the longitudinal central axis B.

For example, such axial thrust is exerted by the water level sensor 30, that is by the intermediate electrical contact 34 thereof, during the insertion (mutual approach) of the water level sensor 30 into the through opening 444 of the water separator element 40.

In the example illustrated in FIGS. 1-6, the contact electrode 52 also has a second stretch inclined radially inwards (approaching the longitudinal central axis B) which is close to the constrained lower end of the contact electrode itself.

Such second tilted stretch for example, is contiguous to the first tilted stretch and de-fines therebetween, an edge (rounded or flattened), which faces the longitudinal central axis B and in fact defines the contact electrode 52, that is the part thereof that comes into direct contact with the intermediate electrical contact 34.

In an alternative embodiment exemplified in the second and in the third embodiment of FIGS. 7-15, in which for example, the intermediate electrical contact 34 is an axial contact facing downwards, the contact electrode 52 accordingly may be an axial contact facing upwards (that is, it is oriented axially upwards with respect to the longitudinal central axis B); in other words, it is defined by a (substantially planar) sur-face of the conductive element 50 that is substantially orthogonal to the longitudinal central axis B, preferably facing towards the upper end of the filtering element (of the filtering septum 41 and/or of the hydrophobic mesh 42 where provided).

In the second embodiment shown in FIGS. 7-12, the contact electrode 52 (that is the upper surface orthogonal to the central longitudinal axis B of the conductive element 50) is for example substantially annular and coaxial with the central longitudinal axis B, and is adapted to be inserted internally from the lower end of the stem 31 (that is of the longitudinal rod 311).

The outer diameter of the contact electrode 52 is substantially lower than or equal to (or at the limit greater than) the outer diameter of the second body 347 of the intermediate electrical contact 34 of the water level sensor 30.

In the third embodiment of FIGS. 12-15, the contact electrode 52 (that is the upper surface orthogonal to the central longitudinal axis B of the conductive element 50) is for example defined by an enlarged head (of a nail) placed at a distance from the central longitudinal axis B less than or equal to the outer diameter of the second body 347 of the intermediate electrical contact 34 of the water level sensor 30 so as to be adapted to contact it.

In practice, the contact electrode 52 (both in the second and third embodiment referred to above) is adapted to be arranged at the same axial height in the casing 20 in which the intermediate electrical contact 34 is located, and to be axially aligned (from the bottom) with a circumferential portion thereof (see FIGS. 12-15) or to the whole circumference thereof (see FIGS. 7-12), thus coming into contact in axial direction with the intermediate electrical contact 34 itself.

In the second and third embodiment of FIGS. 7-15, the contact electrode 52 (that is the whole conductive element 50) is substantially rigid, that is not deformable by the stresses to which it is subjected during operation.

In this configuration, the intermediate electrical contact 34 is, preferably, elastically deformable in a predominantly axial direction, due to the deformability described above of the main body 346.

In particular, the intermediate electrical contact 34 is configured to axially bend/be compressed (away from the lower plate 434 of the filter septum support 43) if stressed by a thrust having an axial component (from bottom to top) and to exert an elastic reaction to this stress (that is exerting an axial elastic thrust force which tends to push down the water separator element 40, for example resting forcedly on a sup-port body provided at a predetermined distance which is not null from the bottom of the cup-like body 21 (and to force—if necessary—the contact between the upper axial end of the main body 346 with the first body 345).

For example, this supporting body is defined by a plurality of shelves deriving from the bottom and/from the side wall of the cup-like body 21.

It is not excluded, as an alternative, that the contact electrode 52 may be elastically deformable in a predominantly axial direction.

In particular, the contact electrode 52 could be configured to bend axially (approaching the lower plate from which it derives) if stressed by a thrust having an axial component (approaching the lower plate from which it derives) and to exert an elastic re-action to such stress (that is exerting an axial elastic thrust force away from the lower plate from which it derives).

In practice, the direct electrical contact between the (rigid or elastically deformable) intermediate electrical contact 34 and the (elastically deformable or rigid) contact electrode 52 is of the forced type and therefore, is more secure.

In case it is elastically deformable, the contact electrode 52 may be defined by or comprise at least one coil of a helical spring, for example having axis parallel to the longitudinal central axis B.

According to the first embodiment (see FIGS. 1-6), the contact electrode 52 may have such a circumferential width so as to involve an arc of circumference smaller than 90°, for example smaller than 15°.

It is not excluded for the contact electrode 52 to have a widened upper end portion, as shown in FIG. 5, which is adapted to enclose a greater circumferential portion of the intermediate electrical contact 34 of a circumferential interspace that was possibly provided between the opposite joined ends (or not wholly joined) of the folded strip that defines the intermediate electrical contact 34 itself.

For example, such widened upper end portion of the contact electrode 52 may have a curved path with axis of curvature parallel to the longitudinal central axis B and preferably, have a given deformability such as to enlarge the curvature in elastic manner, so as to circumferentially enclose the intermediate electrical contact 34 in a more effective manner.

In such circumstance, the contact electrode 52 may have at least two contact portions 52' and 52" for defining two contact areas placed at the height of the intermediate electrical contact 34, and to cover any electrical discontinuities on the outer surface of the intermediate electrical contact 34 itself.

The contact electrode 52 may have annular shape and have such a circumferential width as to involve an arc of circumference greater than 90°, for example equal to 360° (that is, be substantially annular).

As said, the contact electrode 52 (in any embodiment) is electrically connected to the water level electrode 51.

In particular, the conductive element 50 comprises an electric bridge 53 which electrically connects the contact electrode 52 and the water level electrode 51.

The electric bridge 53 is rigidly fixed to the filtering element support (directly and in contact therewith), particularly to the hydrophobic mesh support 44 and/or to the filtering septum support 43, to the hydrophobic mesh support 44 in the example.

In greater detail, the electric bridge 53 is rigidly fixed to the lower plate 443 of the hydrophobic mesh support 44 (see for example first embodiment of FIGS. 1-6) and/or to the lower plate 434 of the filtering septum support 43 (see for example second and third embodiment of FIGS. 7-15), in practice so as to axially cross it.

The electric bridge 53, in fact, leads into (that is, emerges from or surfaces level) at the bottom (at the lower face of the lower plate 443 of the hydrophobic mesh support 44 and/or of the lower plate 434 of the filtering septum support 43), where it joins to the constrained upper end of the water level electrode 51, and leads into (or emerges from or surfaces level) at the top (at the upper face of the lower plate 443 of the hydrophobic mesh support 44 and/or lower plate 434 of the filtering septum support 43), where it joins to the constrained lower end of the contact electrode 52.

Therefore, the electric bridge 53 is at least partly placed in the lower plate 443 of the hydrophobic mesh support 44 (see FIGS. 1-6) and/or of the lower plate 434 of the filtering septum support 43 (see FIGS. 13-15), incorporated therein or protruding therefrom (see FIGS. 7-12), for example by co-molding the conductive element 50 (for example of metal) with the plastic lower plate 443 of the hydrophobic mesh support 44 and/or of the filtering septum support 43 or alternatively, forcedly inserted interlocked or snap-inserted or screwed or other connection) into a through seat, preferably with through axis substantially parallel to the longitudinal central axis B, made in the lower plate 443 of the hydrophobic mesh support 44 itself and/or of the lower plate 434 of the filtering septum support 43.

The electric bridge 53 may be irremovably fixed to the lower plate 443 of the hydrophobic mesh support 44 and/or of the lower plate 434 of the filtering septum support 43 or alternatively, fixed in a removable manner.

Therefore, the electric bridge 53 is axially interposed between the contact electrode 52 and the water level electrode 51 and extends each of them in axial direction one towards the other.

In the preferred embodiment illustrated (see FIGS. 1-15), the electric bridge 53 is made in a single body with the contact electrode 52 and/or the water level electrode 51; in practice, the conductive element 50 is defined by a monolithic body (conductive strip or foil or conductive nail or cylinder or conductive bushing) that comprises (or consists of) the contact electrode 52, the water level electrode 51 and the electric bridge 53 (in which the electric bridge 53 is axially interposed between the contact electrode 52 and the water level electrode 51).

It is not excluded in alternative embodiments, for the electric bridge 53 to be defined by an independent body electrically connected to the contact electrode 52 and to the water level electrode 51.

Moreover, the electric bridge 53 is made of the same electrically conductive material (metal) with which the contact electrode 52 and the water level electrode 51 are made (and/or the filtering element support when the latter is made of a conductive material).

Alternatively, it is possible for the electric bridge 53 to be made of a different electrically conductive material (metal) than the one with which the contact electrode 52 and the water level electrode 51 are made, which for example is more resistive.

In the example illustrated in the first embodiment (see FIGS. 1-6), an upper portion of the electric bridge 53 that emerged from the lower plate 443 of the hydrophobic mesh support 44 is shaped so as to externally enclose a guide block of the connection between the electric bridge 53 and the lower plate 443 themselves, thus for example defining a substantially axial prismatic connection.

Moreover, it is possible to provide for the electric bridge 53 to be part of the filtering element support, that is to be defined in a single body therewith, when the latter is made of an electrically conductive material.

In the second embodiment shown in FIGS. 7-12, the conductive element 50 (which is defined by a tubular body) has the central axis that is coaxial (that is coinciding) with the through axis of the through opening 444 (that is coaxial with the longitudinal central axis B of the filtering element).

In this case, the conductive element 50 internally covers the (whole inner wall of the) through opening 444 (that is the cylindrical wall of a cylindrical shank which de-fines and delimits the through opening itself and extends it inferiorly and/or superiorly by a limited axial stretch with respect to the lower plate 434 of the filtering septum support 43.

In practice, the conductive element 50 comprises a central stretch which defines the aforesaid electric bridge 53 (for example cylindrical and provided with an upper conical flaring), which is inserted into the through opening 444 and two opposite free annular ends which are radially derived in a cantilevered fashion from the central stretch itself).

In particular, a lower (annular) free end defines the water level electrode 51 (and is facing or arranged outside the water separator element 40) and an upper free (annular) end defines the contact electrode 52 (and is axially facing inwards of the water separator element 40).

In this circumstance, the tightly sealed connection between the stem 31 (that is the longitudinal rod 311 thereof) and the through opening 444 is defined by the seal exerted between the lower annular gasket 3110 (fitted on the longitudinal rod itself) and an inner wall of the central stretch (that is of the electric bridge 53) of the conductive element 50.

In addition to that illustrated above, it is possible to provide different and equivalent configurations of the fuel filter 10.

Moreover, unlike that illustrated, an alternative embodiment (not shown in the drawings) may provide for the filtering element to be crossed radially from the inside out-wards and therefore, the hydrophobic mesh 42 (when provided) to be positioned externally to the filtering septum 41.

Here, the inlet duct from which the fuel to be filtered enters, is an inlet, is defined by the aforesaid central (or inner) duct, that is, that leads centrally into the casing 20, that is, of the cover 22, while the outlet duct from which the filtered fuel leaves is the aforesaid peripheral (or external) duct, that is, that leads into the casing 20, that is, of the cover 22, into a peripheral area thereof (close to the side wall thereof) or in any case in fluid communication with the environment radially interposed between the filtering element and the inner wall of the casing 20.

In this circumstance, the fuel that enters the casing 20 from the inlet duct 23 (radially) crosses the water separator element 40 (from the inside outwards), that is first it crosses the filtering septum 41 and then the hydrophobic mesh 42, to then leave (filtered and separated from the water that accumulates in the collection chamber 26) from the outlet duct 24.

In this case, the through opening 444 could be made in the lower plate 434 of the filtering septum support 43 and/or in a lower end area of the outer longitudinal candle 437 (when provided) coaxially associated with the filtering septum 41.

Moreover, as described above, the (only) conductive element 50 could (also) be provided on the lower plate 434 of the filtering septum support 43 and/or at the outer longitudinal candle 437 (when provided) coaxially associated with the filtering septum 41.

In light of that described above, the operation of the fuel filter 10 is the following.

When the water separator element 40 is correctly inserted into the casing 20 and the latter is closed, the water level sensor 30, that is the stem 31 of the same (that is the longitudinal rod 311, where provided), is axially inserted into the water separator element 40 so as to be surrounded by the filtering element, that is by the filtering septum 41 and/or by the hydrophobic mesh 42.

Moreover, the water level sensor 30, in particular the stem 31/the longitudinal rod 311 (that is the lower end thereof), is inserted (at least partially) into the through opening 444 (and/or of the conductive element) 50 which internally covers the same) and in abutment (by sealing) on the perimeter edge thereof (or on the inner wall of the conductive element 50), as described above.

In this operating configuration, the electrical water level contact 33 of the water level sensor 30 is directly placed in the collection chamber 26, the intermediate electrical contact 34 of the water level sensor 30 instead is placed outside the collection chamber 26 in the inner volume of the water separator element 40.

Moreover, the contact electrode 52 of the water separator element 40 is in direct (forced) electrical contact with such intermediate electrical contact 34 and the water level electrode 51 of the water separator element 40 is directly placed in the collection chamber 26.

In practice, the intermediate electrical contact 34 is substantially indirectly placed in the collection chamber 26 by means of the electric interposition of the conductive element 50.

Therefore, the electrical water level contact 33 and the water level electrode 51 are both emerged in the same fluid present in the collection chamber 26.

Since water has greater electric conductivity than fuel (gas oil), if both the electrical water level contact 33 and the water level electrode 51 are emerged in the fuel, the electrical water level contact 33 and the water level electrode 51 are substantially isolated from one another by means of the fluid (fuel) once the electronic circuit of the water level sensor is fed, the water level sensor measures a first current intensity value, depending on the electric resistance of the gas oil at the circuit ends defined by the electrical water level contact 33 and by the water level electrode 51.

If the water that accumulates on the bottom of the casing 20 in the collection chamber 26 reaches such a level as to involve, also only partially, the electrical water level contact 33 and the water level electrode 51, the electronic circuit measures, at the circuit ends defined by the electrical water level contact 33 and by the water level electrode 51, a second current intensity value, depending on the electric resistance of the water and therefore, greater than the first current intensity value, and correspondingly signals, to the vehicle control unit, the need to empty the water accumulated in the collection chamber by means of the discharge duct 25.

The invention thus conceived is susceptible of numerous modifications and variants without departing from the scope of the inventive concept.

Moreover, all the details can be replaced by other technically equivalent elements.

In practice, the materials employed, as well as the specific shapes and sizes, may be any depending on the needs without thereby departing from the scope of protection of the following claims.

The invention claimed is:

1. A fuel filter (10) comprising:
   a casing (20) that has a chamber (26) for collecting water separated from the fuel at a bottom of the casing (20);
   a water level sensor (30) that extends into the casing (20) and is provided with an electrical water level contact (33) extending into the collection chamber (26) and an intermediate electrical contact (34) arranged inside the casing (20) and outside the collection chamber (26); and
   a water separator element (40) housed in the casing (20), wherein the water separator element (40) comprises:
   a filtering element (41, 42) adapted to be crossed by the fuel;
   a filtering element support (43, 44) provided with a through opening (444) crossed by the water level sensor (30) so that the electrical water level contact (33) extends into the collection chamber (26); and
   a conductive element (50) provided on the filtering element support (43, 44), wherein the conductive element (50) is provided with:
   a water level electrode (51) extending into the collection chamber (26); and
   a contact electrode (52) electrically connected with the water level electrode (51) and spaced apart therefrom, wherein the contact electrode (52) is in contact with the intermediate electrical contact (34) of the water level sensor (30);
   wherein a seal connection is defined between the water level sensor (30) and the through opening (444), wherein the seal connection is axially interposed between the intermediate electrical contact (34) and the electrical water level contact (33) of the water level sensor (30) or between the contact electrode (52) and the water level electrode (51) of the conductive element (50) of the filtering element support (43,44).

2. The fuel filter (10) according to claim 1, wherein the water level sensor (30) extends along a longitudinal axis (A) and the through opening (444) peripherally surrounds a connection portion (35) of the water level sensor (30) axially interposed between the electrical water level contact (33) and the intermediate electrical contact (34).

3. The fuel filter (10) according to claim 1, wherein
the filtering element (41, 42) has a substantially tubular shape extending about a longitudinal central axis (B) into which the water level sensor (30) is axially inserted, and
the filtering element support (43, 44) comprises a lower plate (434, 443) fixed at one lower end of the filtering element (41, 42) proximate the collection chamber (26), the through opening (444) being made in the lower plate (434, 443).

4. The fuel filter (10) according to claim 3, wherein the filtering element comprises a filtering septum (41) for filtration of particulate present in the fuel.

5. The fuel filter (10) according to claim 3, wherein the filtering element comprises a hydrophobic mesh (42) for the separation of the water from the fuel.

6. The fuel filter (10) according to claim 5, wherein the filtering element comprises a filtering septum (41) for filtration of particulate present in the fuel, and wherein the filtering septum (41) and the hydrophobic mesh (42) are coaxial to each other.

7. The fuel filter (10) according to claim 1, wherein the through opening (444) is surrounded by a guide body (445) for the water level sensor (30).

8. The fuel filter (10) according to claim 7, wherein the guide body (445) comprises a plurality of separate projections, a side of which lies on a common conical surface converging towards the through opening (444).

9. The fuel filter (10) according to claim 1, wherein at least one of the contact electrode (52) and the intermediate electrical contact (34) is elastically deformable.

10. The fuel filter (10) according to claim 9, wherein the filtering element (41, 42) has a substantially tubular shape developing about a longitudinal central axis (B), at least one of the contact electrode (52) and the intermediate electrical contact (34) being oriented radially and/or axially with respect to such a longitudinal central axis (B) and elastically deformable in a predominantly radial and/or axial direction, respectively.

11. The fuel filter (10) according to claim 1, wherein the contact electrode (52) and the water level electrode (51) are defined by two opposite free ends of a single elongated conductive element (50) made in a single body.

12. The fuel filter (10) according to claim 1, wherein the contact electrode (52) and the water level electrode (51) are defined by two opposite free ends of a single tubular conductive element (50), extending about a central axis, made in a single body.

13. The fuel filter (10) according to claim 12, the central axis of which is coaxial with a through axis of the through opening (444).

14. The fuel filter (10) according to claim 12, wherein the conductive element (50) internally covers the through opening (444).

15. An element (40) for separating water from fuel, for a fuel filter (10), comprising a casing (20) that has a chamber (26) for collecting the water separated from the fuel; and a water level sensor (30) that extends into the casing (20) and is provided with an electrical water level contact (33) extending into the collection chamber (26) and an intermediate electrical contact (34) arranged inside the casing (20) outside the collection chamber (26); and
wherein the water separator element (40) comprises:
a filtering element (41, 42) adapted to be crossed by the fuel;
a filtering element support (43, 44) provided with a through opening (444) adapted to be crossed by the water level sensor (30) of the fuel filter (10) so that a seal connection is defined between the water level sensor (30) and the through opening (444), and the electrical water level contact extends past the filtering element (41, 42) into the collection chamber (26); and
a conductive element (50) provided on the filtering element support (43, 44), wherein the conductive element (50) is provided with:
a water level electrode (51) configured to extend into the collection chamber (26); and
a contact electrode (52) electrically connected with the water level electrode (51) and spaced apart therefrom, wherein the contact electrode (52) is configured to come into contact with the intermediate electrical contact (34) of the water level sensor (30) placed outside the collection chamber (26)
wherein the seal connection is axially interposed between the intermediate electrical contact (34) and the electrical water level contact (33) of the water level sensor (30) or between the contact electrode (52) and the water level electrode (51) of the conductive element (50) of the filtering element support (43,44).

* * * * *